US012501228B2

(12) United States Patent
Osada

(10) Patent No.: US 12,501,228 B2
(45) Date of Patent: Dec. 16, 2025

(54) COMPUTER-READABLE NON-TRANSITORY STORAGE MEDIUM HAVING INFORMATION PROCESSING PROGRAM STORED THEREIN, INFORMATION PROCESSING METHOD. INFORMATION PROCESSING SYSTEM, AND INFORMATION PROCESSING APPARATUS

(71) Applicant: NINTENDO CO., LTD., Kyoto (JP)

(72) Inventor: Jyunya Osada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 196 days.

(21) Appl. No.: 18/465,455

(22) Filed: Sep. 12, 2023

(65) Prior Publication Data

US 2024/0267692 A1 Aug. 8, 2024

(30) Foreign Application Priority Data

Feb. 3, 2023 (JP) ................................ 2023-015564

(51) Int. Cl.
*H04S 7/00* (2006.01)

(52) U.S. Cl.
CPC ........... *H04S 7/301* (2013.01); *H04S 2400/11* (2013.01); *H04S 2400/13* (2013.01)

(58) Field of Classification Search
CPC .. H04S 7/301; H04S 2400/11; H04S 2400/13; H04S 2400/09; H04S 7/302; H04S 7/305; H04S 7/00; G10K 15/02; A63F 13/54
See application file for complete search history.

(56) References Cited

U.S. PATENT DOCUMENTS

| | | | |
|---|---|---|---|
| 7,027,600 | B1 | 4/2006 | Kaji et al. |
| 2006/0126851 | A1 | 6/2006 | Yuen et al. |
| 2014/0126754 | A1 | 5/2014 | Mizuta |

(Continued)

FOREIGN PATENT DOCUMENTS

| | | |
|---|---|---|
| JP | 06-149275 | 5/1994 |
| JP | 09-160549 | 6/1997 |

(Continued)

OTHER PUBLICATIONS

Feb. 20, 2024 Search Report issued in European Patent Application No. 23196970.0, pp. 1-13.

*Primary Examiner* — Yosef K Laekemariam
(74) *Attorney, Agent, or Firm* — Nixon & Vanderhye PC

(57) ABSTRACT

A first parameter is set for each of a plurality of sound data. The first parameter corresponds to a value indicated at a distance at which a second parameter serves as a reference, and the second parameter indicates loudness of a virtual sound in a virtual space and is attenuated in accordance with a distance from a position of a sound source to a virtual microphone in the virtual space. For each of the sound data, on the basis of at least second parameter attenuation characteristic data indicating a relationship between a value of the second parameter and the distance, and the first parameter set in the sound data, a sound volume attenuation characteristic used when a sound volume is attenuated in accordance with the distance from the sound source and indicating a relationship, between the distance and a degree of attenuation of the sound volume, is set.

32 Claims, 20 Drawing Sheets

(56) References Cited

U.S. PATENT DOCUMENTS

| | | | | |
|---|---|---|---|---|
| 2016/0066112 | A1 | 3/2016 | Suyama et al. | |
| 2016/0127849 | A1 | 5/2016 | Suyama et al. | |
| 2019/0105568 | A1 | 4/2019 | Platt et al. | |
| 2020/0162832 | A1 * | 5/2020 | Yasuda | H04S 7/303 |
| 2020/0296532 | A1 | 9/2020 | Wang et al. | |
| 2021/0112329 | A1 | 4/2021 | Zhang et al. | |

FOREIGN PATENT DOCUMENTS

| | | | |
|---|---|---|---|
| JP | 2000-267675 | | 9/2000 |
| JP | 2013-083515 | | 5/2013 |
| JP | 2014-063182 | | 4/2014 |
| JP | 6147486 | B2 | 6/2017 |
| JP | 2021-076768 | | 5/2021 |
| KR | 2021-0004250 | | 1/2021 |
| KR | 2021-0007122 | | 1/2021 |

* cited by examiner

FIG. 19

| VSPL VALUE (3051) | SILENT-DEEMED SOUND VOLUME (LKFS) (3052) | DIFFUSE ATTENUATION VALUE (3053) | MID AND LOW FREQUENCY RANGE EXCESS ATTENUATION VALUE (3054) | HIGH FREQUENCY RANGE EXCESS ATTENUATION VALUE (3055) |
|---|---|---|---|---|
| 40dB | −65 LKFS | −7dB/DD | −0.25dB/D | −0.65dB/D |
| 60dB | −65 LKFS | −7dB/DD | −0.25dB/D | −0.65dB/D |
| 80dB | −60 LKFS | −6dB/DD | −0.25dB/D | −0.65dB/D |
| 100dB | −60 LKFS | −5dB/DD | −0.20dB/D | −0.50dB/D |
| 120dB | −55 LKFS | −4.5dB/DD | −0.15dB/D | −0.35dB/D |
| 140dB | −55 LKFS | −4dB/DD | −0.07dB/D | −0.15dB/D |

COMPUTER-READABLE NON-TRANSITORY STORAGE MEDIUM HAVING INFORMATION PROCESSING PROGRAM STORED THEREIN, INFORMATION PROCESSING METHOD. INFORMATION PROCESSING SYSTEM, AND INFORMATION PROCESSING APPARATUS

CROSS REFERENCE TO RELATED APPLICATION

This application claims priority to Japanese Patent Application No. 2023-15564 filed on Feb. 3, 2023, the entire contents of which are incorporated herein by reference.

FIELD

The present disclosure relates to a method for expressing a sound to be reproduced in a virtual space.

BACKGROUND AND SUMMARY

Hitherto, as for sound expression in a virtual space, the nature in the real world in which loud sounds can be heard farther away and quiet sounds cannot be heard farther away, is expressed. For example, a game in which sound attenuation based on distance is expressed in a virtual space is also known.

In the case of expressing the above-described sound attenuation, if the same attenuation characteristic is applied to all of sound sources that are set in the virtual space, the difference in loudness of each sound cannot be expressed. Therefore, in the case of expressing the difference in loudness by attenuation characteristics, it is necessary to individually set an attenuation characteristic for each sound source. In this case, if there are a large number of sound sources (sound data) to be placed in the virtual space, the cost for individually setting attenuation characteristics becomes a problem. It is also difficult to verify whether the individually set attenuation characteristics are attenuation having a sense of unity in the virtual space as a whole.

Therefore, an object of the present disclosure is to provide a computer-readable non-transitory storage medium having an information processing program stored therein, an information processing method, an information processing system, and an information processing apparatus each of which can respectively apply attenuation characteristics having a sense of unity to a plurality of sound sources in a virtual space.

In order to attain the object described above, for example, the following configuration examples are exemplified.

(Configuration 1)

Configuration 1 is directed to a computer-readable non-transitory storage medium having stored therein an information processing program causing a computer of an information processing apparatus to:

set a first parameter virtually indicating loudness of a sound, for each of a plurality of sound data, the first parameter corresponding to a value indicated at a distance at which a second parameter serves as a reference, the second parameter indicating loudness of a virtual sound in a virtual space and being attenuated in accordance with a distance from a position of a sound source to a virtual microphone in the virtual space; and for each of the sound data, on the basis of at least second parameter attenuation characteristic data indicating a relationship, between a value of the second parameter and the distance, varied in accordance with a value of the first parameter, and the first parameter set in the sound data, set a sound volume attenuation characteristic used when a sound volume at which the sound data is outputted is attenuated in accordance with the distance from the sound source associated with the sound data, the sound volume attenuation characteristic indicating a relationship between the distance and a degree of attenuation of the sound volume.

According to the above configuration example, for a plurality of sound data, sound volume attenuation characteristics corresponding to distance can be set on the basis of a unified standard that reflects the loudness of a virtual sound in the virtual space.

(Configuration 2)

According to Configuration 2, in Configuration 1 described above, the information processing program may further cause the computer to set the value of the first parameter of each of the sound data on the basis of at least an amplitude of a waveform of the sound data.

According to the above configuration example, an appropriate first parameter can be set automatically to some extent on the basis of the sound volume of the sound data.

(Configuration 3)

According to Configuration 3, in Configuration 2 described above, the information processing program may further cause the computer to set, as the first parameter of each of the sound data, a value obtained by correcting the value set on the basis of the amplitude of the waveform with a further specified predetermined value.

According to the above configuration example, characteristics such as the reach distance, etc., of the sound in the virtual space can be adjusted and set regardless of the characteristic of the sound volume of the sound data and without increasing or decreasing the sound volume itself.

(Configuration 4)

According to Configuration 4, in any one of Configurations 1 to 3 described above, the information processing program may further cause the computer to, for each of the sound data:

set an upper limit and a lower limit for the second parameter in a relationship between the distance and the second parameter corresponding to the first parameter set in the sound data in the second parameter attenuation characteristic data; and set the sound volume attenuation characteristic such that the sound volume is not attenuated at the distance equal to or smaller than a first distance at which the second parameter is the upper limit, the sound is silent at the distance equal to or larger than a second distance at which the second parameter is the lower limit, and when the distance is between the first distance and the second distance, the sound volume is attenuated at a degree of attenuation based on a relationship between the second parameter and the distance.

According to the above configuration example, an appropriate sound volume attenuation characteristic can be generated on the basis of the second parameter attenuation characteristic data. In addition, the sound volume attenuation characteristic can be set such that sound expression is performed such that a sound having a large first parameter can be heard farther away and a sound having a small first parameter disappears immediately.

(Configuration 5)

According to Configuration 5, in Configuration 4 described above, the information processing program may further cause the computer to set, as the lower limit, a value of the second parameter deemed as silent and set on the basis of a pre-specified condition.

According to the above configuration example, the sound volume deemed as silent and the lower limit for the second parameter can be set in association with each other. In addition, since the second parameter and the distance are linked, the lower limit may be set as the second parameter or may be set as the distance, which can improve the ease of design.

(Configuration 6)

According to Configuration 6, in Configuration 4 or 5 described above, the information processing program may further cause the computer to set, as the upper limit, a value obtained by adding, to the lower limit, a value obtained by subtracting a value corresponding to a pre-specified sound volume deemed as silent from a value based on an amplitude of the sound data.

According to the above configuration example, the distance at which attenuation of the sound starts can be automatically and appropriately determined. In addition, the attenuation of the sound can also be made to start at an almost constant distance.

(Configuration 7)

According to Configuration 7, in any one of Configurations 1 to 6 described above, the second parameter in the second parameter attenuation characteristic data may indicate a relationship in which second attenuation corresponding to the distance is performed in addition to first attenuation corresponding to a square of the distance.

According to the above configuration example, distance attenuation of the sound in which diffuse attenuation and excess attenuation of the sound in the real world are added can be expressed in the virtual space.

(Configuration 8)

According to Configuration 8, in any one of Configurations 4 to 6 described above, the second parameter in the second parameter attenuation characteristic data may indicate a relationship in which second attenuation corresponding to the distance is performed in addition to first attenuation corresponding to a square of the distance, and the information processing program may further cause the computer to set a filter characteristic in which a predetermined filter is applied to a waveform of the sound data at a strength corresponding to the distance at the distance equal to or larger than a third distance at which the second parameter is the upper limit, on the basis of second parameter attenuation characteristic data, for a high frequency range, indicating a relationship in which the second attenuation is added more strongly than attenuation indicated by the second parameter attenuation characteristic data.

(Configuration 9)

According to Configuration 9, in Configuration 8 described above, the filter may be a low-pass filter.

According to the above configuration example, the characteristic of the sound in which the sound in the high frequency range is attenuated according to the distance can be expressed. In particular, it is possible to express that the sound in the high frequency range is strongly influenced by attenuation proportional to the distance. In addition, it is possible to start applying the filter at the distance at which the sound volume of the sound in the high frequency range is virtually assumed to begin to be attenuated, thereby suppressing an uncomfortable feeling caused by starting applying the filter at a close distance from the sound source.

(Configuration 10)

According to Configuration 10, in any one of Configurations 1 to 6 described above, the information processing program may further cause the computer to set a filter characteristic in which a predetermined filter is applied to a waveform of the sound data at a strength corresponding to the distance, on the basis of the first parameter.

According to the above configuration example, various filters can be applied to the waveform data such that the loudness of the virtual sound and the distance from the sound source are reflected, thereby expanding the range of sound expression.

(Configuration 11)

According to Configuration 11, in any one of Configurations 1 to 6 described above, the first parameter and the second parameter may each indicate a virtual sound pressure level in the virtual space.

According to the above configuration example, the loudness of the sound in the virtual space can be taken as a concept similar to a "sound pressure", which indicates the loudness of a sound in the real world.

According to the present disclosure, for a plurality of sound data, sound volume attenuation characteristics corresponding to distance can be set on the basis of a unified standard that reflects the loudness of a virtual sound in the virtual space.

BRIEF DESCRIPTION OF THE DRAWINGS

FIG. 19 illustrates a memory map showing a non-limiting example of the various kinds of data stored in the storage section 84.

DETAILED DESCRIPTION OF NON-LIMITING EXAMPLE EMBODIMENTS

Hereinafter, an exemplary embodiment will be described.

[Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, or the like. In the exemplary embodiment, a personal computer will be described as an example of the information processing apparatus.

Figure 1:
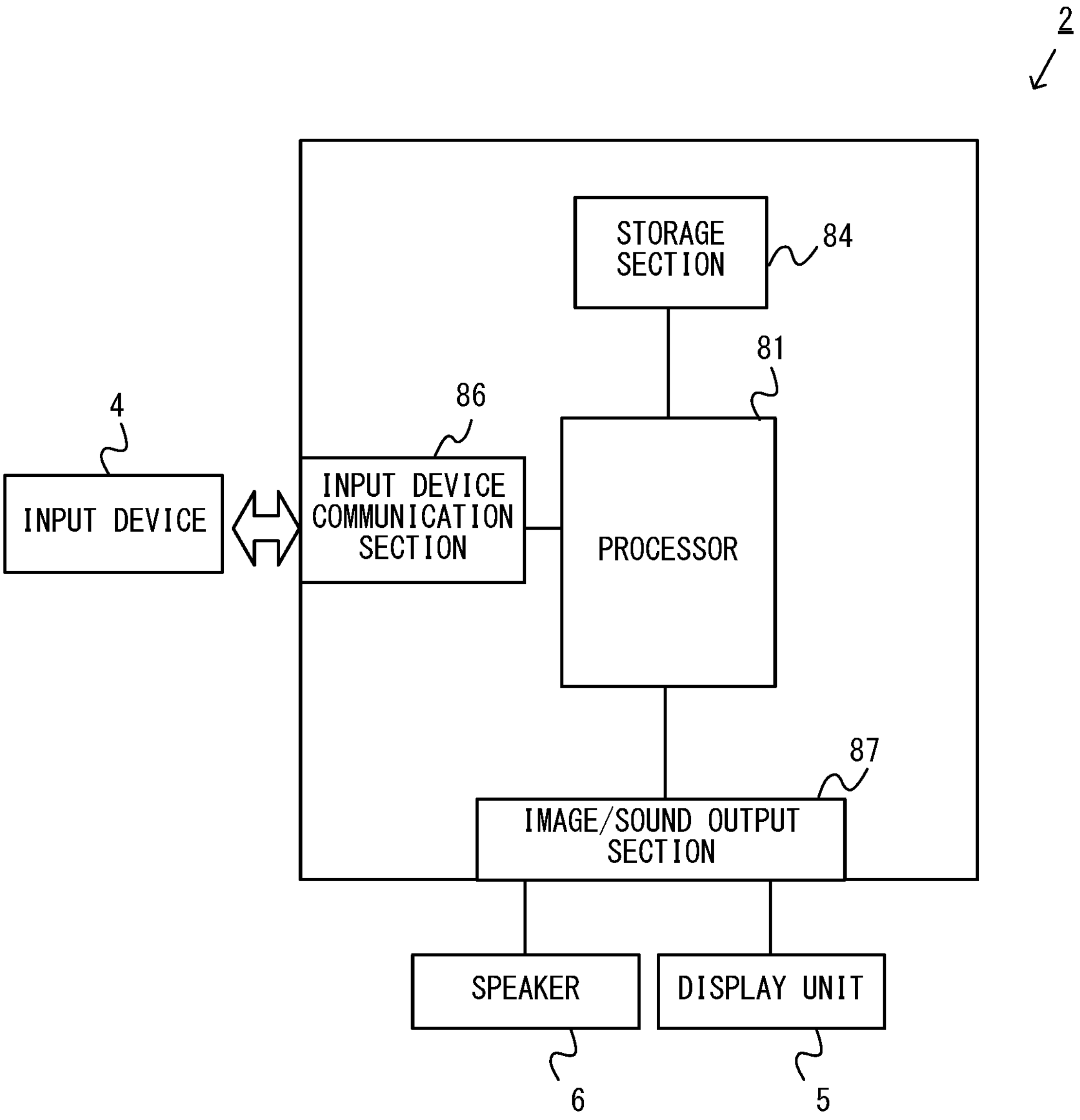
FIG. 1 is a block diagram showing a non-limiting example of the internal configuration of an information processing apparatus 2.

FIG. 1 is a block diagram showing an example of the internal configuration of an information processing apparatus 2 according to the exemplary embodiment. The information processing apparatus 2 includes a processor 81. The processor 81 is an information processing section for executing various types of information processing to be executed by the information processing apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program stored in a storage section 84. The storage section 84 may be, for example, an internal storage medium such as a flash memory and a dynamic random access memory (DRAM), or may be configured to utilize an external storage medium mounted to a slot that is not shown, or the like.

The information processing apparatus 2 also includes an input device communication section 86 for the information processing apparatus 2 to perform wired or wireless communication with input devices such as a keyboard and a mouse.

Moreover, a display unit 5 (for example, a liquid crystal monitor, or the like) and a speaker 6 are connected to the information processing apparatus 2 via an image/sound output section 87. The processor 81 outputs an image generated, for example, by executing the above information processing, to the display unit 5 via the image/sound output section 87. In addition, the processor 81 outputs a generated sound signal to the speaker 6 via the image/sound output section 87.

Next, the principle and outline of the processing in the exemplary embodiment will be described. In the exemplary embodiment, as for sound expression in a virtual three-dimensional space (hereinafter, simply referred to as virtual space), a purpose of the exemplary embodiment is to express distance attenuation of sound in a more natural manner. For example, a purpose of the exemplary embodiment is to express the phenomenon in the real world in which loud sounds can be heard farther away and quiet sounds cannot be heard farther away, such that an uncomfortable feeling is prevented from being given in the virtual space as much as possible. For the expression of distance attenuation of sound in the virtual space, the following methods have been conventionally used in general. First, simply, as the distance between a virtual microphone (may be referred to as listener, etc.) and a virtual sound source (hereinafter, simply referred to as sound source) increases, a sound volume value of the sound of the sound source is decreased. Also, as the distance increases, a filter (e.g., a low-pass filter) is more strongly applied. Moreover, reverb processing may be performed on a sound at a larger distance. These methods can be said to be methods of changing parameters of each sound source such as a sound volume value. Then, as for how to attenuate a sound, these parameters are conventionally adjusted for each sound source at the stage of game development, for example. However, when there is a large number of sound data, the amount of work required for such adjustments is enormous. In addition, from the viewpoint of sound expression in the same virtual space (e.g., virtual game world), when such individual adjustment is performed for each sound source, it is difficult to verify whether or not the sound expression is sound expression having a sense of unity in the virtual space.

In this respect, in the exemplary embodiment, ideologically, processing that focuses on "how to change the parameter" is performed without changing the point of "which parameter is to be changed". That is, the processing is based on the viewpoint of how to create a "characteristic" that "a sound is attenuated when a distance increases". In the exemplary embodiment, processing based on an idea that the conventionally used parameters are utilized more appropriately in a balanced manner is performed focusing on a point of trying to approximate what phenomenon of sound propagation is applicable for each parameter, on the basis of distance attenuation in the real world. Although described in detail later, a method of the exemplary embodiment allows sound data to be designed and generated such that distance attenuation of each sound in the virtual space can be expressed more naturally. In addition, a plurality of sounds in the virtual space are allowed to be designed under a unified rule. As a result, sound expression having a sense of unity can be realized.

In the exemplary embodiment, as a premise, the following phenomena in the real world are considered as basic principles:

- loud sounds can be heard farther away;
- quiet sounds cannot be heard farther away; and
- the sound volume difference between point sound sources is not reversed.

Giving supplementary description regarding this point, in the real world, there may be cases where a quiet sound can be heard farther away depending of the shape of a sound source such as a line sound source or a surface sound source. In the exemplary embodiment described below, point sound sources are assumed in principle, and it is assumed that there is no case where a quiet sound can be heard farther away.

In the real world, a sound volume is obtained as the sum of those of "direct sound" and "indirect sound". As for the nature of these sounds, the direct sound can be said to be attenuated in accordance with the direct distance between a hearer and a sound source. On the other hand, the indirect sound can be said to have the nature of almost no attenuation since the indirect sound remains as reverberation, for example. Based on this point, the following description mainly assumes expression of direct sound by distance attenuation. However, the method of the exemplary embodiment can also be applied to indirect sound.

As the processing described in the exemplary embodiment, for example, processing at the stage of game development is assumed. The contents described below can be realized, for example, in the form of a development tool or editor. In other words, the technical concept of the exemplary embodiment can also be said to represent an idea for creating a development editor or tool. Using a development tool or the like that reflects the contents of the exemplary embodiment, a developer designs sounds to be reproduced in the virtual space, and can store sound source object data or the like in which sound data of the sounds and various parameters indicating distance attenuation characteristics of the sounds are associated with each other. The stored data can then be recorded, for example, as game ROM data. When executing game processing, a sound program of the game reads the waveforms and the attenuation characteristics from the ROM data, and reproduces the sound at a sound volume corresponding to the distance in the virtual space (the attenuation characteristics are for that purpose). According to the exemplary embodiment, when determining the distance attenuation characteristic of the sound volume of each sound, it is possible to determine an optimal distance attenuation characteristic for each of sound sources for a plurality of sounds in the same virtual space under a unified rule. As a result, distance attenuation of each sound can be expressed more naturally, and expression of distance attenuation of each sound in the virtual space can also be performed as expression having a sense of unity. Moreover, the developer does not have to take time and effort to individually and manually adjust parameters for each sound source.

In the exemplary embodiment, for the above-described sound expression by distance attenuation in the virtual space, a scale indicating the "loudness of a sound in the virtual space" is used. The larger this scale is, the farther the sound reaches. Specifically, in the exemplary embodiment, a concept of "virtual sound pressure level" and parameters are used. In the following description, this virtual sound pressure level is referred to as VSPL (Virtual Sound Pressure Level). In addition, for convenience of description, "dB (decibel)" is used as the unit of the VSPL. Although the term "sound pressure level" is used, the "sound pressure" in the real world is not necessarily simulated, but the "sound pressure level" is used as one scale indicating the "loudness of a sound in the virtual space". Therefore, in another exemplary embodiment, as for this concept, for example, a parameter of "sound power" may be used, and any other parameter may be used as long as it is a scale having the same effect.

In the exemplary embodiment, the above VSPL is set for each sound to be used in the virtual space. In the exemplary embodiment, it is assumed that a value of the VSPL can be set arbitrarily on the basis of the subjectivity of the developer (sound designer, etc.), etc. For example, a value of the VSPL can be set on the basis of the subjectivity of the developer such that "this sound is a sound having a VSPL of 78 dB".

The basic principle of the processing according to the exemplary embodiment will be described below.

First, as for distance attenuation in the real world, the exemplary embodiment focuses on two types of attenuation, "diffuse attenuation" and "excess attenuation", and a method in which these types of attenuation are reflected as an attenuation characteristic of the above VSPL in a virtual world is adopted. Finally, a distance attenuation characteristic of a sound volume is determined on the basis of the attenuation characteristic of the VSPL.

[Diffuse Attenuation]

The diffuse attenuation is a model of the phenomenon in the real world in which sound becomes quieter in accordance with distance. In conventional game processing, a sound may be expressed to be distance-attenuated in a virtual space by simulating this diffuse attenuation. In this respect, in the exemplary embodiment, the calculation of attenuation by this diffuse attenuation is also used.

Figure 2:
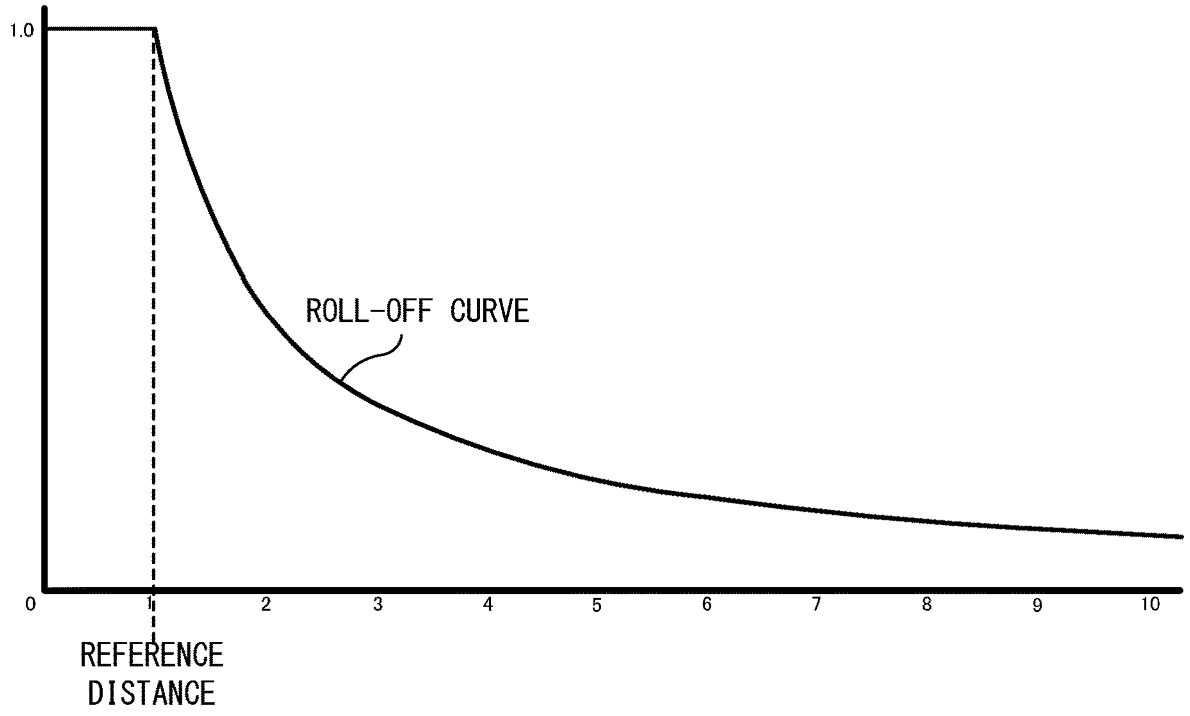
FIG. 2 is a non-limiting example diagram for describing diffuse attenuation.

The diffuse attenuation will be described briefly. The diffuse attenuation is attenuation based on a path distance until a sound reaches a hearer. For example, assuming a point sound source in the real world, the sound thereof diffuses spherically and it is known that the sound is attenuated by 6 dB when the distance from the sound source doubles. If this is considered in a calculation model, it is shown as attenuation by 6 dB per double distance, i.e., "−6 [dB/DD] (double distance)". This is also attenuation in which the sound intensity is inversely proportional to the square of the distance. In addition, when this calculation model is graphed, a graph shown in FIG. 2 is obtained, for example. The graph in FIG. 2 shows a roll-off curve indicating the degree of attenuation based on distance, in which the vertical axis indicates a roll-off coefficient and the horizontal axis indicates the distance. In addition, the roll-off coefficient is "1", and a reference distance is set to "1". The reference distance is the distance at which attenuation begins, and the example in FIG. 2 shows that attenuation begins at a distance of "1". The calculation model from which the results as shown in this graph are obtained can be applied to a virtual game world to simulate diffuse attenuation of a sound in the virtual space.

In the exemplary embodiment, the calculation of attenuation by this diffuse attenuation is also used. Here, in the case where only the above calculation model of the diffuse attenuation is applied as expression of attenuation of a sound in the virtual world, theoretically, a sound emitted from a certain position in the virtual space, for example, a sound whose VSPL is set to "80 dB", can be heard at a distance of 1000 meters away, which is the distance at which the sound is attenuated to "0 dB". However, it is inconceivable that, for example, a human voice can be heard at a distance of 1000 meters away in the real world. Therefore, if the above calculation model of the diffuse attenuation is simply applied to the virtual space as it is, a distant sound may be heard unnaturally even for sound expression in a game, so that the expression can also be expression from which an uncomfortable feeling remains. That is, using the diffuse attenuation alone can be said to be insufficient for expression of distance attenuation of a sound in the virtual space.

[Excess Attenuation]

Here, it is also known that in the real world, attenuation called excess attenuation occurs before direct sound or indirect sound reaches a human ear. The excess attenuation is a phenomenon in which direct sound or indirect sound is attenuated by absorption by the moisture in the air. That is, the excess attenuation is attenuation caused by the influence of the natural environment (air, temperature, wind velocity, etc.). The following points are known as characteristics of the excess attenuation. First, in the case of the excess attenuation, unlike the diffuse attenuation, it is known that the attenuation is simply proportional to distance ([dB/D]).

The excess attenuation also has a characteristic that the amount of attenuation is different in each frequency band, and in particular, attenuation easily occurs in a high frequency range. In the exemplary embodiment, a method in which the phenomenon of easy attenuation in the high frequency range is expressed through sound expression with a "high frequency filter" (e.g., a biquad filter, more specifically, a low-pass filter) applied, is adopted (described in detail later).

Figure 3:
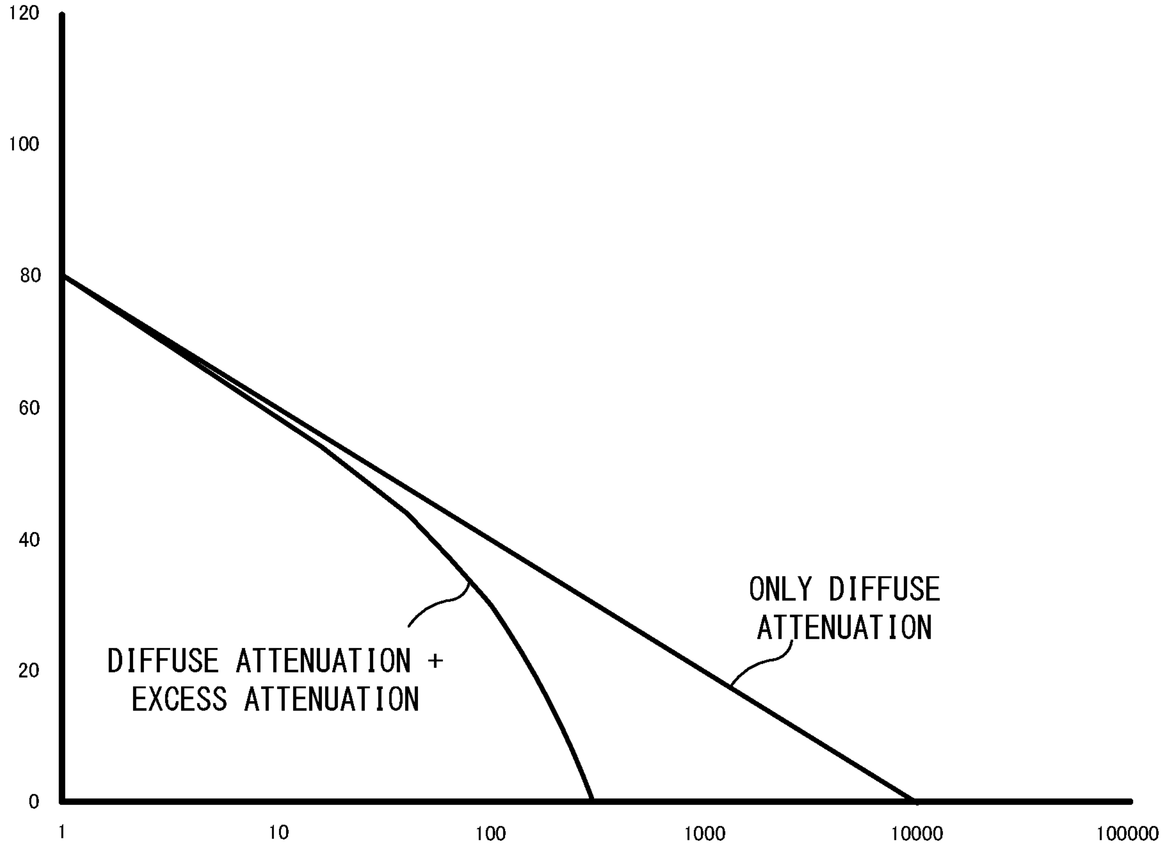
FIG. 3 is a non-limiting example diagram for describing excess attenuation.

In light of the above two types of attenuation, it is conceivable that the amount of attenuation of direct sound can be indicated in the form of diffuse attenuation+excess attenuation. FIG. 3 shows a graph that compares attenuation curves in the case where the diffuse attenuation alone is considered and the case where the excess attenuation is added to the diffuse attenuation. The graph is a logarithmic graph illustrating a sound whose VSPL as described above is set to "80 dB", in which the vertical axis indicates the sound pressure level and the horizontal axis indicates the distance. In addition, an excess attenuation value is set to "−0.1 [dB/D]". As shown in the graph in FIG. 3, in the case of the diffuse attenuation alone, the distance at which attenuation is completed is approximately 1000 m, and in the case where the excess attenuation is applied to the diffuse attenuation, the distance at which attenuation is completed is approximately around 300 m. Therefore, by combining these two types of attenuation, the distance at which attenuation is completed can be shortened, so that it can be said that expression closer to the distance attenuation in the real world is enabled. For example, it can be said that it is unnatural in the real world that a sound reaches a location at a distance of 1000 m away, but it can be said that it is not so unnatural in the real world that a sound reaches a location 300 m away.

Figure 4:
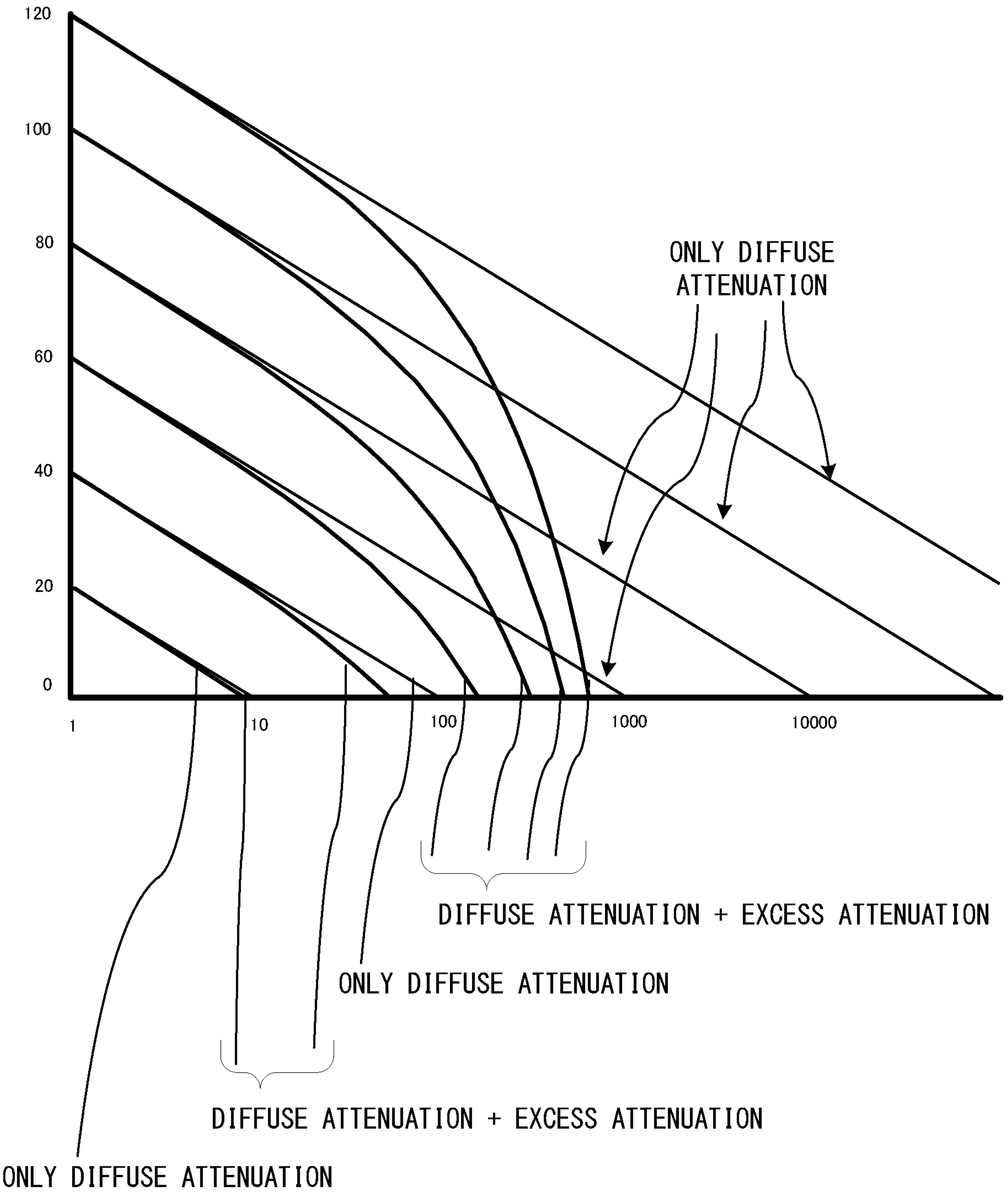
FIG. 4 is a non-limiting example diagram for describing the excess attenuation.

One of the characteristics of the excess attenuation is that sounds having high sound pressure levels (loud sounds) are greatly influenced by the excess attenuation and sounds having low sound pressure levels (quiet sounds) are fully attenuated before being influenced by the excess attenuation. For example, FIG. 4 shows a graph that compares the degrees of attenuation at a plurality of sound pressure levels in the case of the diffuse attenuation alone and in the case of diffuse attenuation+excess attenuation, assuming the real world. In this graph, the vertical axis indicates the sound pressure level, and the horizontal axis indicates the distance. In the example of FIG. 4, for example, a sound having a sound pressure level of 120 dB SPL is greatly influenced by the excess attenuation, and is fully attenuated at a distance that is much shorter than the distance at which the sound is fully attenuated by the diffuse attenuation. Meanwhile, for example, as for a sound having a sound pressure level of 20 dB SPL, the distance at which the sound is fully attenuated is the almost the same between the case of the diffuse attenuation and the case where the excess attenuation is further added. In other words, it can be said that the influence of the excess attenuation is smaller as the sound pressure level decreases. Therefore, it is conceivable that quiet sounds are fully attenuated by the diffuse attenuation before being influenced by the excess attenuation. In the exemplary embodiment, such a characteristic can also be expressed in the virtual world by performing attenuation calculation with the diffuse attenuation and the excess attenuation being combined as described above, so that it can be said that more natural sound expression that gives a less uncomfortable feeling is enabled.

As described above, in the exemplary embodiment, basically, expression of distance attenuation in the virtual world is considered by combining the diffuse attenuation and the excess attenuation. Specifically, the attenuation curve obtained by adding the diffuse attenuation and the excess attenuation as shown in FIG. 3 above is used as a curve indicating a VSPL attenuation characteristic (hereinafter, referred to as VSPL attenuation curve). A distance attenuation characteristic (roll-off curve as shown in the graph in FIG. 2) of the sound volume of each sound is determined on the basis of the VSPL attenuation curve. However, in the exemplary embodiment, the entirety of the VSPL attenuation curve obtained by adding the diffuse attenuation and the excess attenuation is not used as it is, but a method in which a partial range of the VSPL attenuation curve is used is adopted. This point will be described below.

[Range of Waveform]

Generally, for example, in the case of emitting a sound in information processing such as game processing, the sound is held as waveform data. As for such waveform data, when the amplitude is very small, it can be said that the sound is practically equivalent to silence in terms of both signal and output. Therefore, if the amplitude is such a small amplitude, it is considered that even if the sound is not faithfully reproduced, there is not much influence on the user's hearing. In light of this point, in the exemplary embodiment, a sound having an amplitude equal to or lower than a certain value is regarded and treated as "silent". A reproduction process is omitted for amplitude portions that are deemed as silent, thereby reducing the processing load.

In the exemplary embodiment, a "sound volume deemed as silent" is set as a setting for regarding an amplitude equal to or lower than a certain value as silent. As with the above VSPL, a value of the sound volume deemed as silent can be set arbitrarily on the basis of the subjectivity of the developer, etc. Here, the sound volume itself can be calculated on the basis of the amplitude of the waveform, so that it can be said that even when the same VSPL is set for sounds, the sound volumes thereof are different if the amplitudes of the waveforms thereof are different. In light of this point, in the exemplary embodiment, a "sound volume" deemed as silent is set. Accordingly, a "range" described later can be set in a unified manner for sounds having the same VSPL. For the sake of convenience in the following description, the case where the sound volume (loudness value) deemed as silent is "−65 LKFS" is assumed here as an example.

When the sound volume deemed as silent is determined as described above, a range in which the sound volume of the waveform data can be changed is determined. For example, it is assumed that a sound volume multiplying factor is expressed in the range from "1.0" (maximum value) to "0.0" (minimum value). Under this assumption, it is assumed that there is a sound whose VSPL is set to "80 dB". In addition, it is assumed that the sound volume of the sound is "−24 LKFS" when the sound volume multiplying factor for this sound is "1.0". The curve shown in FIG. 3 above is used as a VSPL attenuation curve assuming the sound whose VSPL is set to "80 dB". When such a sound is assumed and the above sound volume deemed as silent is determined to be "−65 LKFS", the sound volume when the sound volume multiplying factor is "0.009" corresponds to the sound volume deemed as silent. In this case, the range of the waveform data is 41 LU (loudness unit) which is the difference of the above sound volume. In addition, since 1 LU is the same as 1 dB, the range of the waveform data can also be said to be 41 dB.

Figure 5:
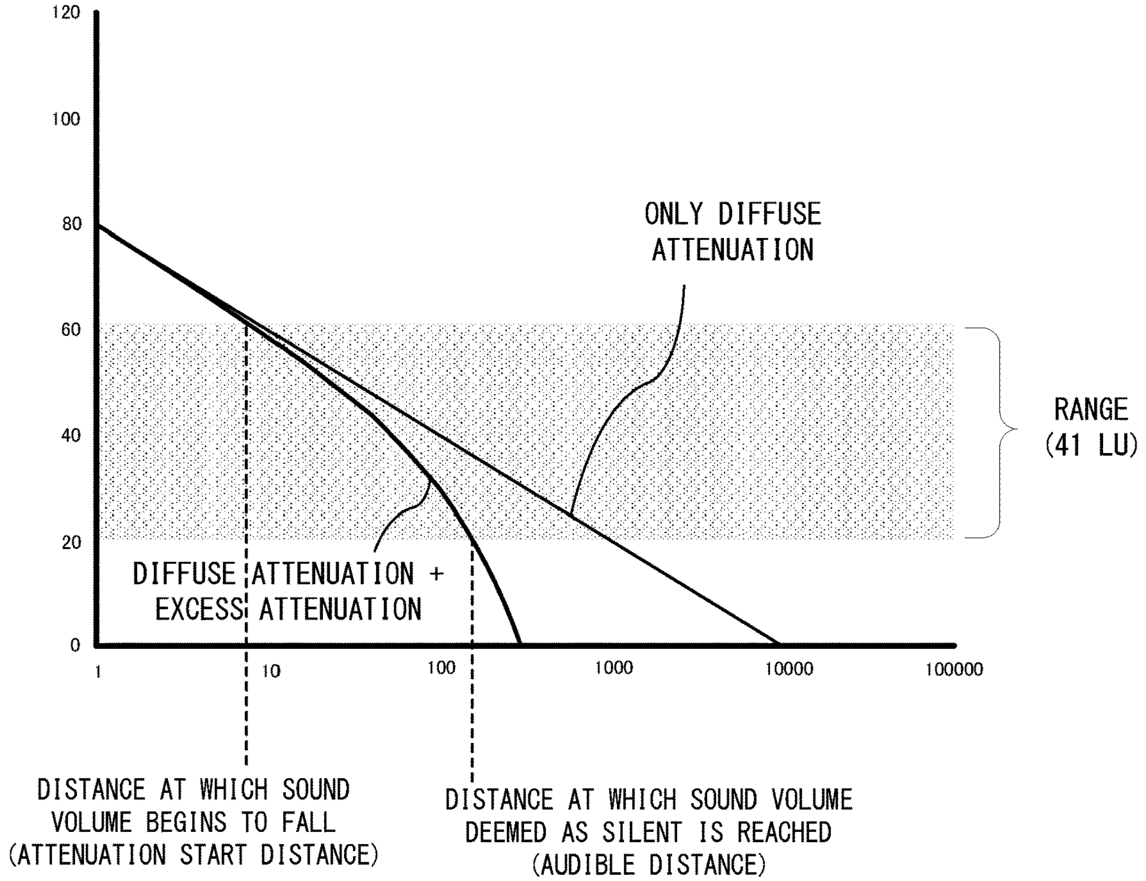
FIG. 5 is a non-limiting example diagram for describing a range.

FIG. 5 shows an example of the case of applying the above range to the waveform data of the sound whose VSPL is "80 dB". When a VSPL corresponding to the above sound volume deemed as silent is taken as the "lower limit" of the range, a value obtained by adding a VSPL corresponding the above difference, to the VSPL corresponding to the sound volume deemed as silent is the "upper limit" of the range. The example of FIG. 5 shows that the VSPL corresponding to the lower limit of the range is 20 dB and the VSPL corresponding to the upper limit is 61 dB. Since the range is a range in which the sound volume can be changed, the range can be said to indicate a value to which the sound volume can be decreased. In the above example, for a sound source using the above waveform data, the sound volume thereof can be decreased by only 41 dB in the virtual space.

Figure 6:
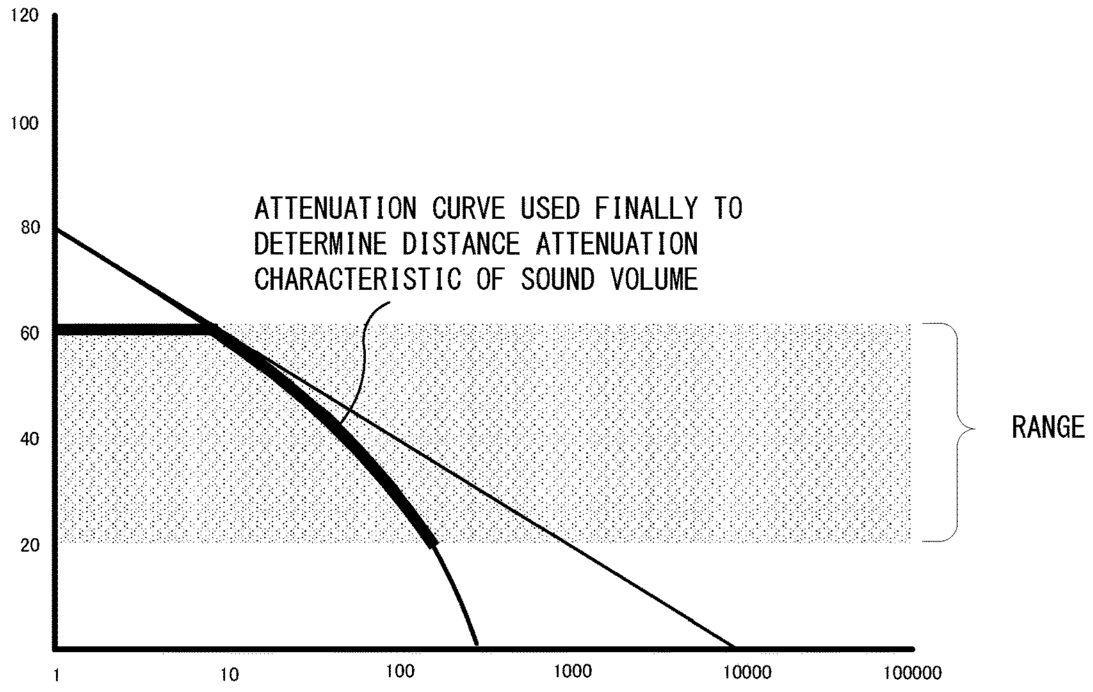
FIG. 6 is a non-limiting example diagram for describing the range.

Here, focusing on the upper limit of the range in FIG. 5 above, the distance at which the value of the VSPL corresponding to the upper limit of the range intersects the VSPL attenuation curve obtained by combining the diffuse attenuation and the excess attenuation is the distance at which the sound volume begins to fall. In the example in FIG. 5, this distance is generally a distance slightly smaller than 10 m. As described above, since the sound volume changes only within the range, the sound volume cannot be changed to a sound volume higher than the sound volume at which the VSPL corresponds to 61 dB. That is, in a section to the distance at which the sound volume begins to fall, even when the distance from the sound source is changed, the sound volume remains unchanged at the sound volume corresponding to the upper limit of the range. In other words, when the lower limit of the range is determined, the upper limit of the range is determined, and the distance at which the sound volume begins to fall is also automatically determined. In addition, when the distance from the sound source falls below the lower limit of the range, the sound thereof is deemed as silent, and sound reproduction for the sound source is no longer performed. Such attenuation of the sound is shown on a graph in FIG. 6. FIG. 6 is a graph showing the attenuation of the VSPL in the range by a thick line. The example in FIG. 6 shows that a sound whose VSPL is "60 dB" and whose sound volume multiplying factor is "1.0" (maximum value) is heard until the distance from the sound source becomes about a distance slightly smaller than 10 m, and the VSPL is gradually attenuated in the section of about 10 m to 200 m, and the sound gradually becomes quieter along with this. A VSPL attenuation curve in which the sound is deemed as "silent" and disappears at a distance of approximately 200 m, is shown. The portion indicated by such a thick line is finally used to determine the distance attenuation characteristic of the sound volume for the waveform data. In other words, the roll-off curve shown in FIG. 2 above is calculated on the basis of the attenuation characteristic indicated by the thick line portion.

Figure 7:
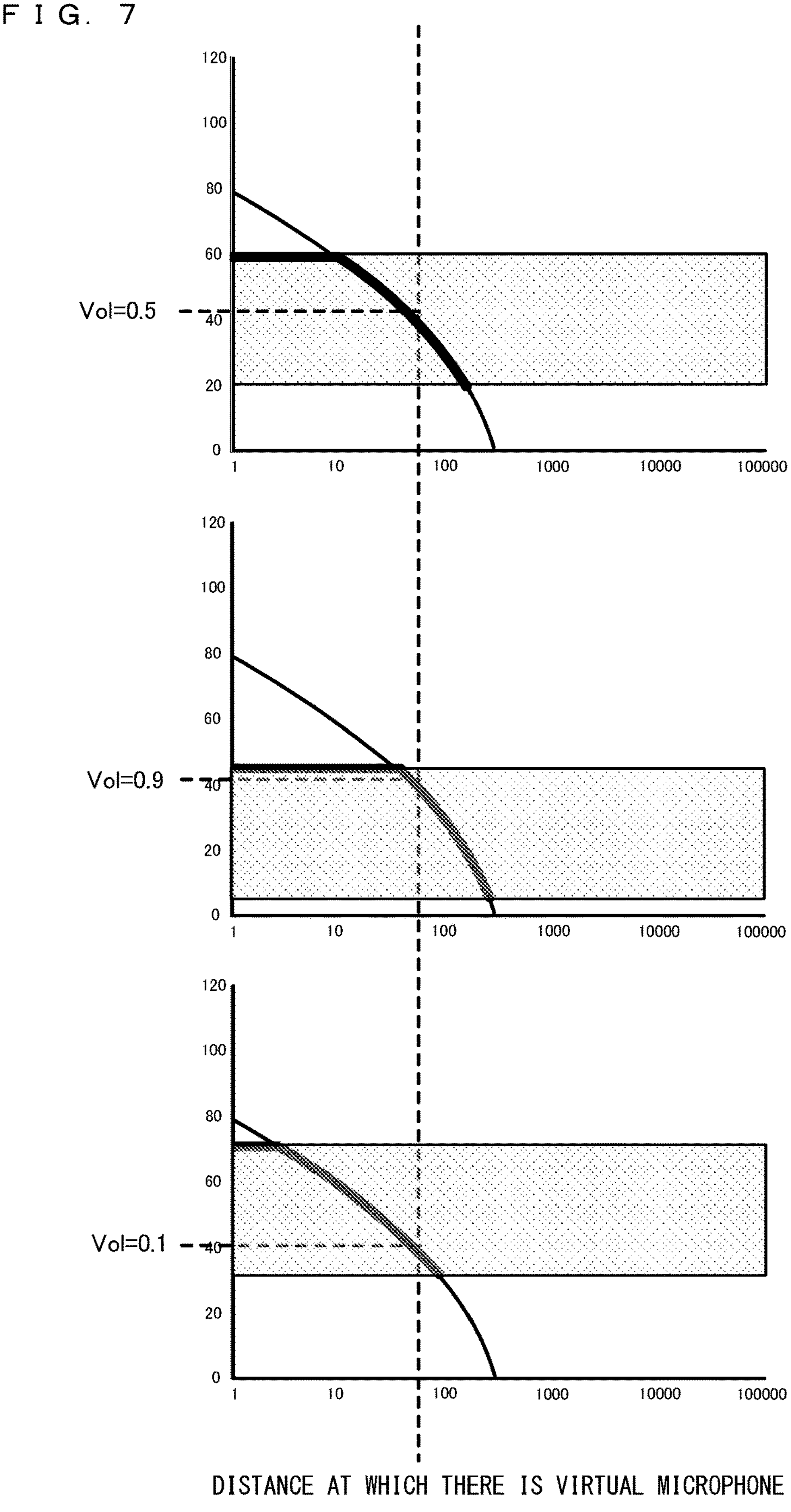
FIG. 7 is a non-limiting example diagram for describing the range.

In the following description, the distance at which the sound volume begins to fall is referred to as "attenuation start distance", and the distance at which the sound volume reaches the sound volume deemed as silent is referred to as "audible distance". The attenuation start distance can also be considered to be substantially the same as the reference distance in the roll-off curve in FIG. 2 above. In addition, the sound volume deemed as silent, that is, the VSPL corresponding to the lower limit of the range, is referred to as "deemed-silent VSPL". Moreover, the VSPL attenuation characteristic corresponding to the thick line portion in the range as shown in FIG. 7 above is referred to as "in-range attenuation curve".

Meanwhile, since the sound volume deemed as silent, that is, the distance at which it is desired for the sound to reach, can be set arbitrarily by the developer as described above, it can be said that the above range can be set arbitrarily for each waveform data. However, if a different range is set for each waveform data, the overall sound volume balance and sense of unity may be impaired. For example, it is assumed that a plurality of waveforms have the same VSPL and have the same loudness value. In this case as well, if the range settings are different, the attenuation start distance and the audible distance are also different for each sound, so that the sound volume for each waveform data may be different at the same distance. FIG. 7 shows graphs for comparing in-range attenuation curves for three different waveform data assumed to have the same VSPL. In FIG. 7, the width of the range in each waveform data is the same, but values set as the upper and lower limits are different. In addition, the attenuation start distance is also different for each waveform data. These graphs show that when sounds related to these three waveform data are heard at the same distance, even though the VSPL is the same, the sound volumes at which these sounds are heard are different from each other.

To address such a problem, in the exemplary embodiment, one of a plurality of sounds to be used in the virtual space is determined as a "reference sound". Then, distance attenuation characteristics of the other sounds are determined on the basis of relative sound volume differences between the other sounds and the reference sound. That is, the reference sound is used as a base for setting the range to attempt unified setting in the same virtual space.

[Design of Reference Sound]

First, a method for determining (flow of design of) the reference sound will be described. The design of the reference sound can be advanced, for example, through the following flow. First, a sound volume deemed as silent is determined. Here, the case where "−65 LKFS" is set as the sound volume deemed as silent as described above is used as an example.

Next, a sound to be used as the reference sound is selected. The reference sound may be selected arbitrarily, but, for example, the voice of a player character may be determined as the reference sound.

Next, the VSPL of the reference sound is determined. The VSPL is a VSPL assuming the distance at which the reference sound can be heard at its maximum sound volume. This VSPL may be determined arbitrarily on the basis of the subjectivity of the developer as described above. Alternatively, the VSPL may be calculated on the basis of the sound volume (amplitude of the waveform) of the sound. In this case, when only the sound volume of waveform data of the sound is determined, an appropriate VSPL can be set automatically to some extent. For this, it is conceivable to use, for example, a predetermined formula for conversion, a predefined conversion table, or the like.

Next, a distance at which the reference sound is made to reach is determined. That is, the above audible distance is determined. The audible distance may also be determined arbitrarily on the basis of the subjectivity of the developer, etc. The lower limit of the above range and the deemed-silent VSPL are determined on the basis of the audible distance, and the upper limit of the range is also inevitably determined.

[Design of Sounds Other than Reference Sound]

Next, the design of sounds other than the reference sound, that is, the determination of distance attenuation characteristics thereof, will be described. For the sounds other than the reference sound, distance attenuation characteristics are determined on the basis of the reference sound. In the following description, for convenience, a sound to be targeted for an operation of determining the distance attenuation characteristic, among the sounds other than the reference sound, is referred to as "target sound".

First, the VSPL of the target sound is determined. In the exemplary embodiment, the VSPL of the target sound is not determined arbitrarily like the reference sound, but is determined on the basis of the sound volume difference between the target sound and the reference sound. That is, in the exemplary embodiment, the VSPL of the reference sound is set arbitrarily by the developer, and the VSPLs of the other sounds are determined on the basis of the relative relationship with the reference sound. Accordingly, unified setting in the same virtual space is enabled as described above. More specifically, the VSPL of each of the other sounds is determined by the following method. First, the sound volume of each of the waveforms of the reference sound and the target sound is assumed to be a sound volume at a distance (short distance) at which the sound source is approached until the sound is reproduced at the maximum sound volume. In this case, the sound volume difference between the waveforms of the reference sound and the target sound is considered to approximate the difference in VSPL therebetween. That is, the sound volume difference between the maximum sound volumes can be taken as the difference in sound pressure level as it is. Therefore, the VSPL of the target sound can be calculated by adding this difference to the VSPL of the reference sound. For example, it is assumed that the loudness of the reference sound is "−26 LKFS", the VSPL of the reference sound is "78 dB", and the loudness of the target sound is "−20 LKFS". In this case, the loudness difference (sound volume difference) at the short distance is "6". Therefore, "84 dB" which is obtained by adding 6 to "78 dB", which is the VSPL of the reference sound, is determined as the VSPL of the target sound. When the VSPL of the target sound is determined as described above, a VSPL attenuation curve obtained by combining the diffuse attenuation and the excess attenuation as described above is also derived. Although described in detail later, in the exemplary embodiment, a different VSPL attenuation curve can be defined for each VSPL, and a method using a VSPL attenuation curve corresponding to a determined VSPL is adopted.

Figure 8:
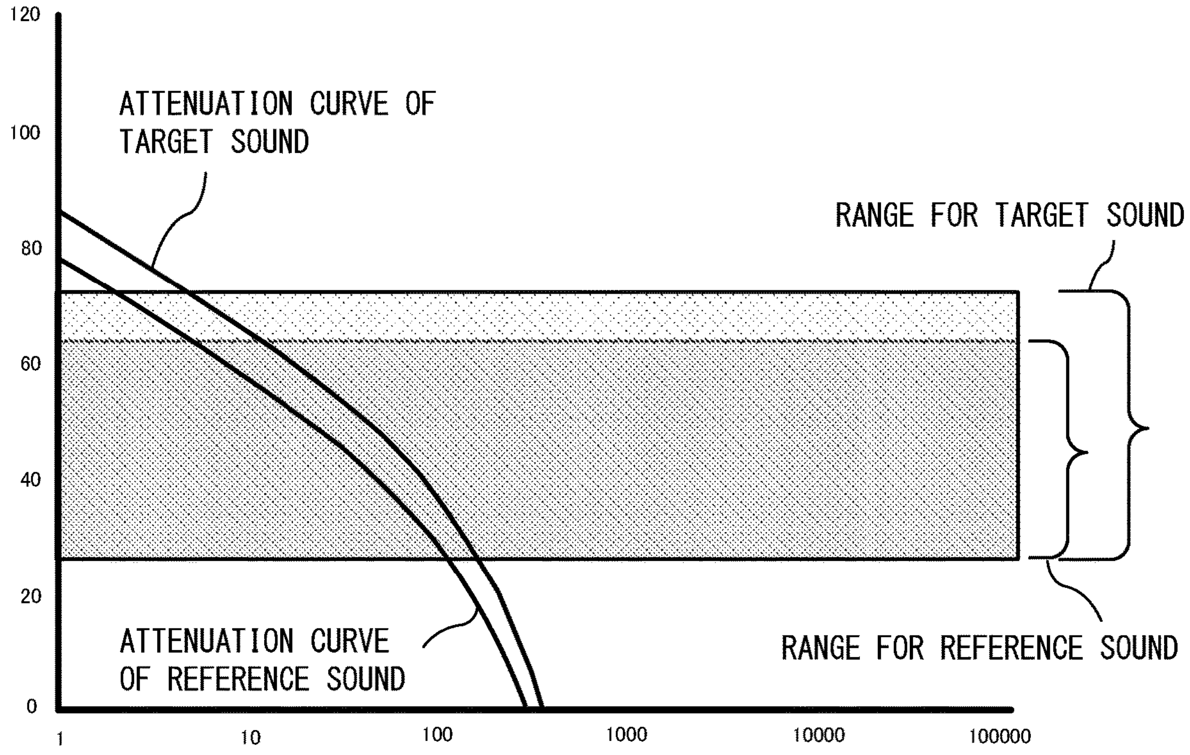
FIG. 8 is a non-limiting example diagram for describing the design of a target sound.
Figure 9:
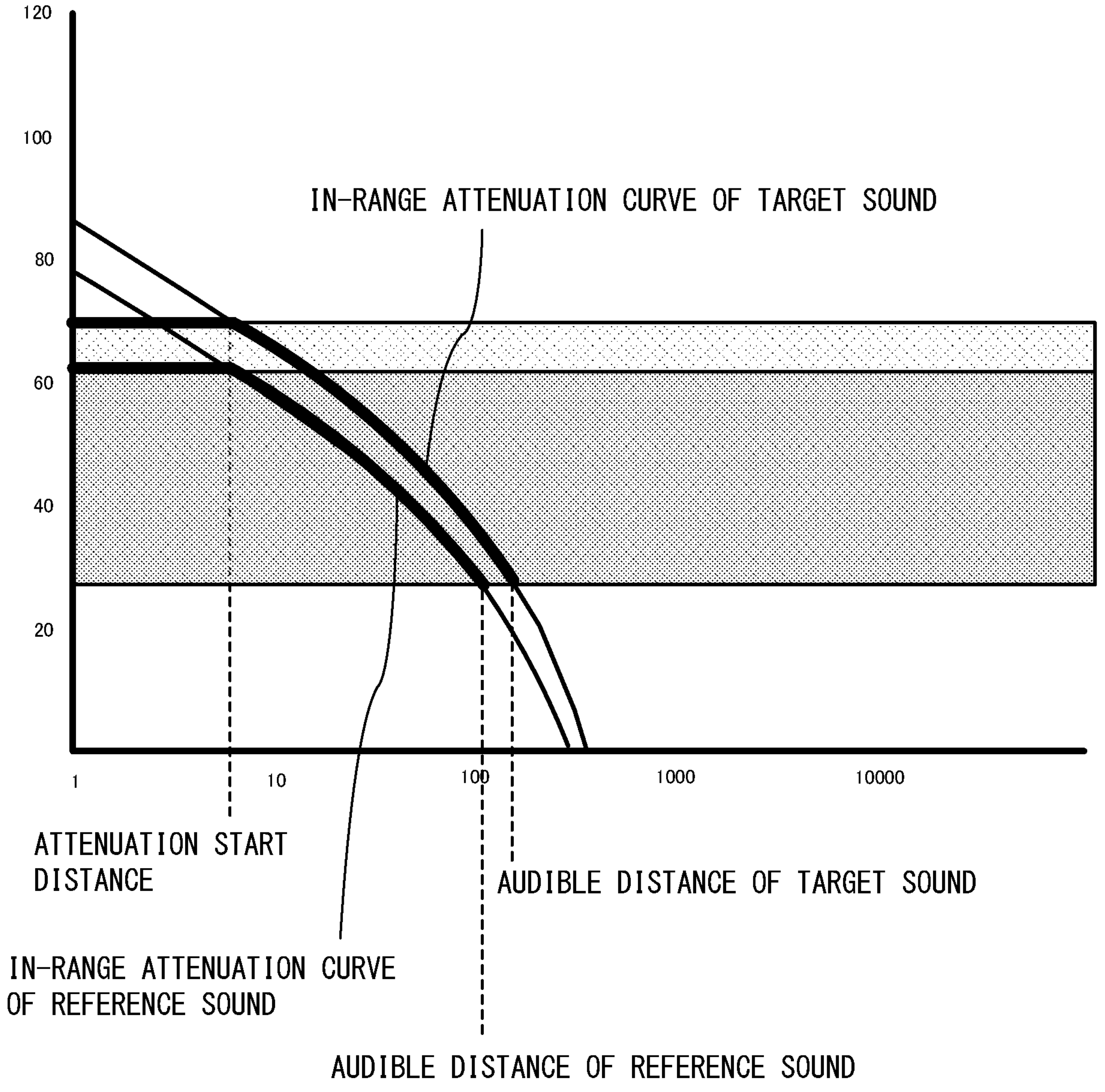
FIG. 9 is a non-limiting example diagram for describing the design of the target sound.

Next, the range for the target sound is determined. In the exemplary embodiment, the deemed-silent VSPLs of the reference sound and the target sound are made to coincide with each other as shown in FIG. 8. Accordingly, the lower limits of the ranges of the waveforms thereof can be made to coincide with each other. That is, a unified rule is applied to the lower limits of the ranges. In addition, when the lower limit is determined, the upper limit of the range for the target sound is also determined. As a result, for example, a relationship can be derived between the reference sound and the target sound, as shown in a graph in FIG. 9. FIG. 9 is a graph showing the respective in-range attenuation curves of the reference sound and the target sound. Here, as shown in FIG. 9, the attenuation start distances of the reference sound and the target sound are equal to each other. As a result, in a section during attenuation, the sound volume difference between the reference sound and the target sound is not reversed at any distance, so that the sound volume magnitude relationship therebetween is maintained. The sound volume difference itself is not necessarily constant due to the influence of the excess attenuation.

In FIG. 9, when focusing on the lower limits of the ranges, that is, the audible distances, the audible distance of the target sound which is louder than the reference sound is slightly longer than that of the reference sound. That is, a phenomenon that the distance at which the target sound can be heard is slightly longer than the distance at which the reference sound can be heard, can be expressed in the virtual space. In other words, the difference in loudness between sounds can also be expressed appropriately in the virtual space. The example in FIG. 9 shows the case where the target sound is louder than the reference sound, but the same result is obtained in the case of the opposite relationship. In other words, when the target sound is quieter than the reference sound, the audible distance of the target sound is shorter than that of the reference sound while the sound volume difference therebetween is maintained during attenuation. That is, the distance at which a sound having a higher VSPL than the reference sound can be heard is longer than that for the reference sound, and the distance at which a sound having a lower VSPL than the reference sound is shorter than that for the reference sound. Therefore, the difference in loudness between sounds can also be expressed appropriately.

[Setting Characteristic of Attenuation Curve for Each VSPL]

Meanwhile, as shown in the above example, as a result, the attenuation start distances of the reference sound and the target sound are equal to each other. In other words, it can be said that the reference distance in the roll-off curve shown in FIG. 2 above is the same therebetween. In addition, when sound sources for the reference sound and the target sound are assumed to be point sound sources, the same roll-off coefficient is applied. Therefore, as a result, it can be said that a roll-off curve having exactly the same characteristic may be applied to all sounds. However, there are cases where it is desired to perform richer sound expression, such as the case of expressing a virtual space, which is different from reality, or the case where it is desired to perform expression in a wider dynamic range from a game standpoint. For example, the waveform of a quiet sound has a small amplitude, and thus it can be said that the range in which the sound volume of this sound can be raised or lowered is also narrow. Therefore, the width of the above-described range becomes narrow, and as a result, it is considered that the sound quickly reaches the audible distance when the distance from the sound source is slightly increased. That is, it can be said that a quiet sound is likely to disappear. On the other hand, there may be a situation in which, due to the development of the game, it is desired to allow even a quiet sound to be heard as long as possible without being attenuated too quickly. For example, in the game, there may be a case where a quiet sound is emitted in a quiet environment. In such a case, there may be a situation in which the user listens closely so as not to miss the quiet sound. Or, there may be a situation in which it is desired to make the user aware of the existence of the quiet sound. When such situations are assumed, there is a need to ensure that even a quiet sound is not treated as silent even when the distance is slightly increased, but is continuously heard even when the distance is increased to some extent.

On the other hand, from a game standpoint, there is also a need to suppress a situation in which a loud sound reaches an excessively far location. A loud sound is greatly influenced by the excess attenuation, but even so, there is a possibility that if a sound is heard from a sound source located too far away, an uncomfortable feeling may remain in terms of the virtual world or the game.

Therefore, in the exemplary embodiment, it is possible to define a VSPL attenuation curve having a different attenuation characteristic for each VSPL. Specifically, the characteristic can be adjusted by making the parameter of the attenuation vary in accordance with the value of the VSPL. Accordingly, a sound having a low VSPL can be prevented from being deemed as silent quickly. In addition, a sound having a high VSPL can be prevented from reaching an excessively far location. As a result, it is possible to design sounds according to the virtual space or the convenience of the game contents.

Figure 10:
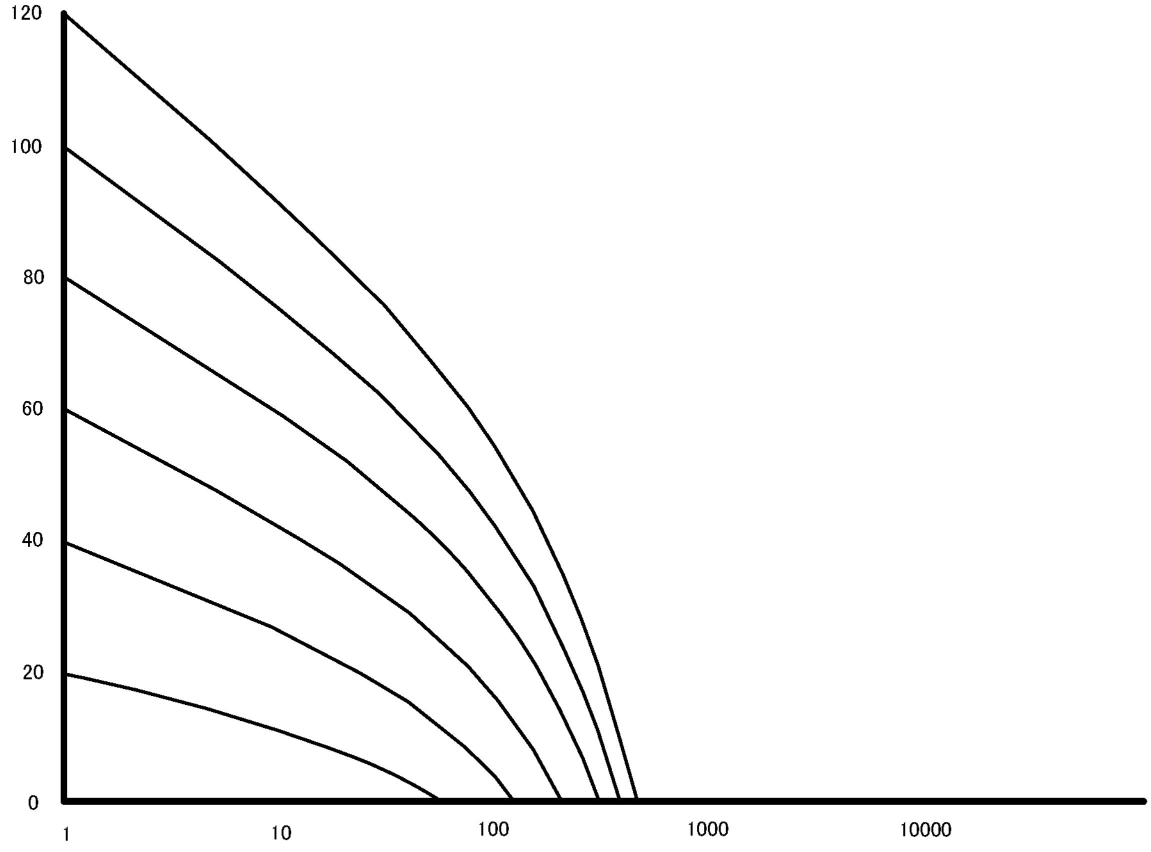
FIG. 10 is a non-limiting example of a VSPL attenuation curve defined for each VSPL.

FIG. 10 shows an example of the VSPL attenuation curve defined for each VSPL. In FIG. 10, the vertical axis indicates the VSPL, and the horizontal axis indicates the distance from the sound source. When the graph in FIG. 10 is compared to that in FIG. 4, for example, for a sound having a VSPL of 20 dB, the curve is generally gentler at a distance of 10 m or larger than the curves for the other VSPLs such that the quiet sound is prevented from being excessively quiet. Conversely, for example, for a sound having a VSPL of 120 dB, the curve is generally steeper than the curves for the other VSPLs such that the sound is prevented from reaching an excessively far location.

As described above, in the exemplary embodiment, it is possible to define a VSPL attenuation curve having a different attenuation characteristic for each VSPL Accordingly, an appropriate VSPL attenuation curve can be applied for each VSPL set or determined for each waveform, according to the virtual space or the convenience of the game contents. That is, a rule for distance attenuation of sounds in the entire virtual space to be expressed can be defined.

[VSPL Correction]

As described above, by making it possible to define a VSPL attenuation curve for each VSPL, richer sound expression is enabled while attenuation expression having a sense of unity is performed. In addition, it is also possible to perform adjustment such that a sound having a low VSPL is less likely to disappear and a loud sound is prevented from reaching an excessively far location. Here, when converting sounds into waveform data and expressing the sounds, the sound volume difference between the multiple sounds may not always be desired to match the difference in VSPL therebetween. For example, a loud sound such as an explosion sound may be created with a waveform having a small amplitude, or a quiet sound such as a sound by rubbing of clothing may be created with a waveform having a large amplitude. Considering such cases, there may be a case where an appropriate VSPL is not determined on the basis of only the sound volume difference from the reference sound as described above. In addition, in the case where it is desired to make a sound reach a far location, there may be a case where the sound volume of the sound becomes excessively large, and it is difficult to use such a sound when the amplitude of the waveform of the sound is merely increased. Therefore, in the exemplary embodiment, in order to enable correction for this point, it is made possible to individually set a "VSPL correction value" for each sound source. The VSPL of the target sound is deemed to be defined on the basis of the VSPL correction value.

Hereinafter, an example of correction using the VSPL correction value will be described. For example, it is assumed that there is a reference sound having a loudness of "−26 LKFS" and a VSPL of "78 dB", and there is a target sound having a loudness of "−20 LKFS". In addition, on the basis of the sound volume difference therebetween, the VSPL of the target sound is calculated to be "84 dB". Moreover, the audible distance set on the basis of the above reference sound is "100 m" in scale in the virtual space. In addition, the case where it is desired to cause a state where the target sound can be faintly heard even at a distance of "120 m" due to the development of the game, is assumed. That is, the case where the target sound does not have an appropriate VSPL by only the sound volume difference from the reference sound, is assumed. For example, the case where a VSPL of about "96 dB" is needed to allow the sound to reach a location at a distance of "120 m" away, is assumed. In such a case, "12 dB" can be set as the VSPL correction value for the target sound. However, only the correction value is set, and the waveform of the target sound itself is not changed. That is, for the target sound having a VSPL of "84 dB", "12 dB" can be set as the VSPL correction value without making any changes such as increasing the sound volume of the waveform thereof.

Figure 11:
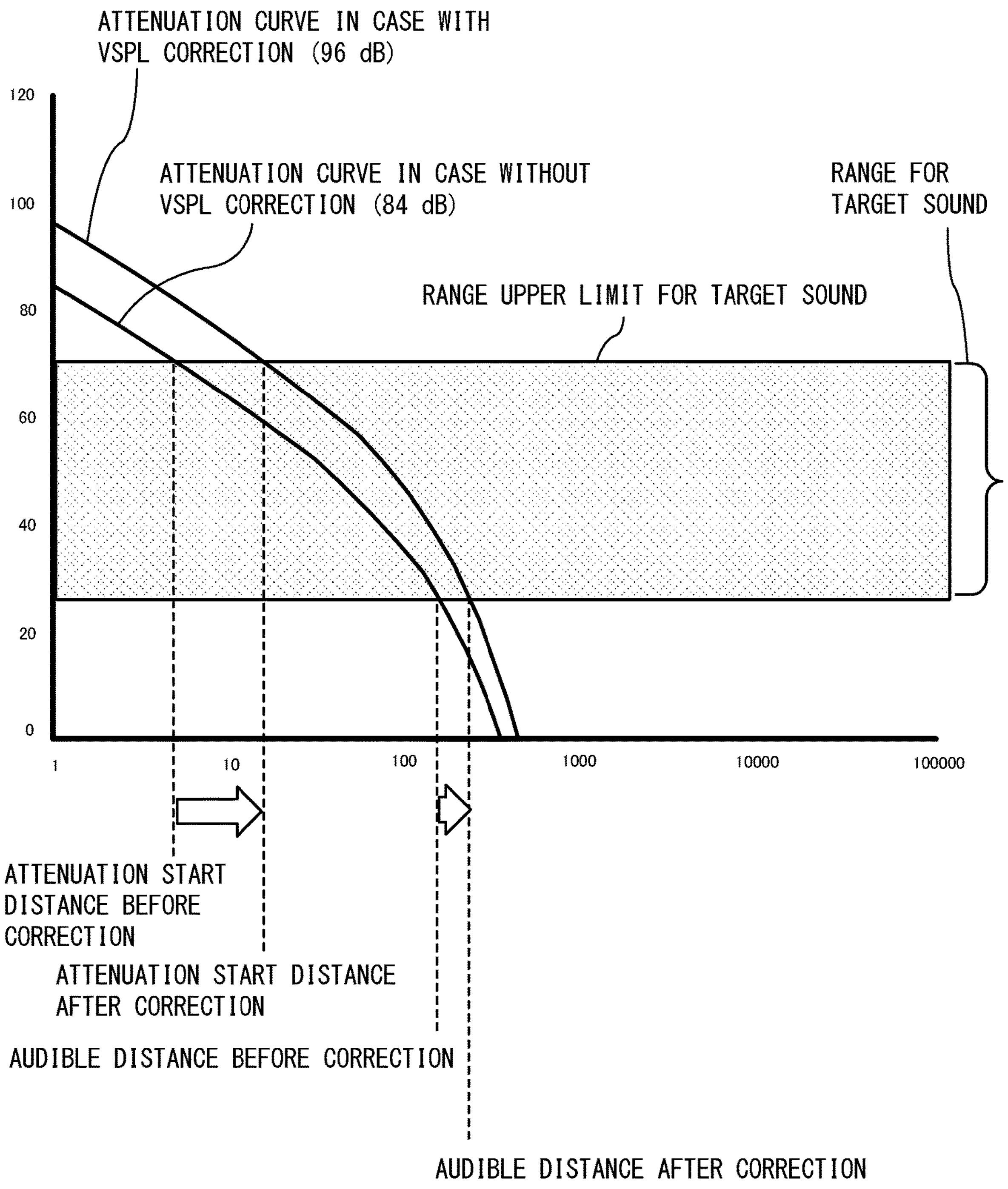
FIG. 11 is a non-limiting example diagram for describing VSPL correction.

A VSPL attenuation curve corresponding to the deemed VSPL after correction is adopted as a VSPL attenuation curve to be used for waveform data for which such a VSPL correction value is set. In the above example, a VSPL attenuation curve in the case where a VSPL is "96 dB" is adopted. In this case, the deemed-silent VSPL itself is made to coincide with that of the reference sound. FIG. 11 shows an example of VSPL attenuation curves before and after VSPL correction. In addition, FIG. 11 also shows the range for the target sound. The example of FIG. 11 shows the attenuation curve before correction when the VSPL is "84 dB" and the attenuation curve after correction when the VSPL is "96 dB". As a result of the VSPL correction described above, the audible distance can be longer than the audible distance before correction as shown in FIG. 11. In addition, when seeing the VSPL attenuation curve after correction in FIG. 11, it is found that the attenuation start distance of the sound volume is also slightly extended. That is, as a result, a state where only the reference distance of the roll-off curve described above is extended without changing the roll-off coefficient, is obtained.

Figure 12:
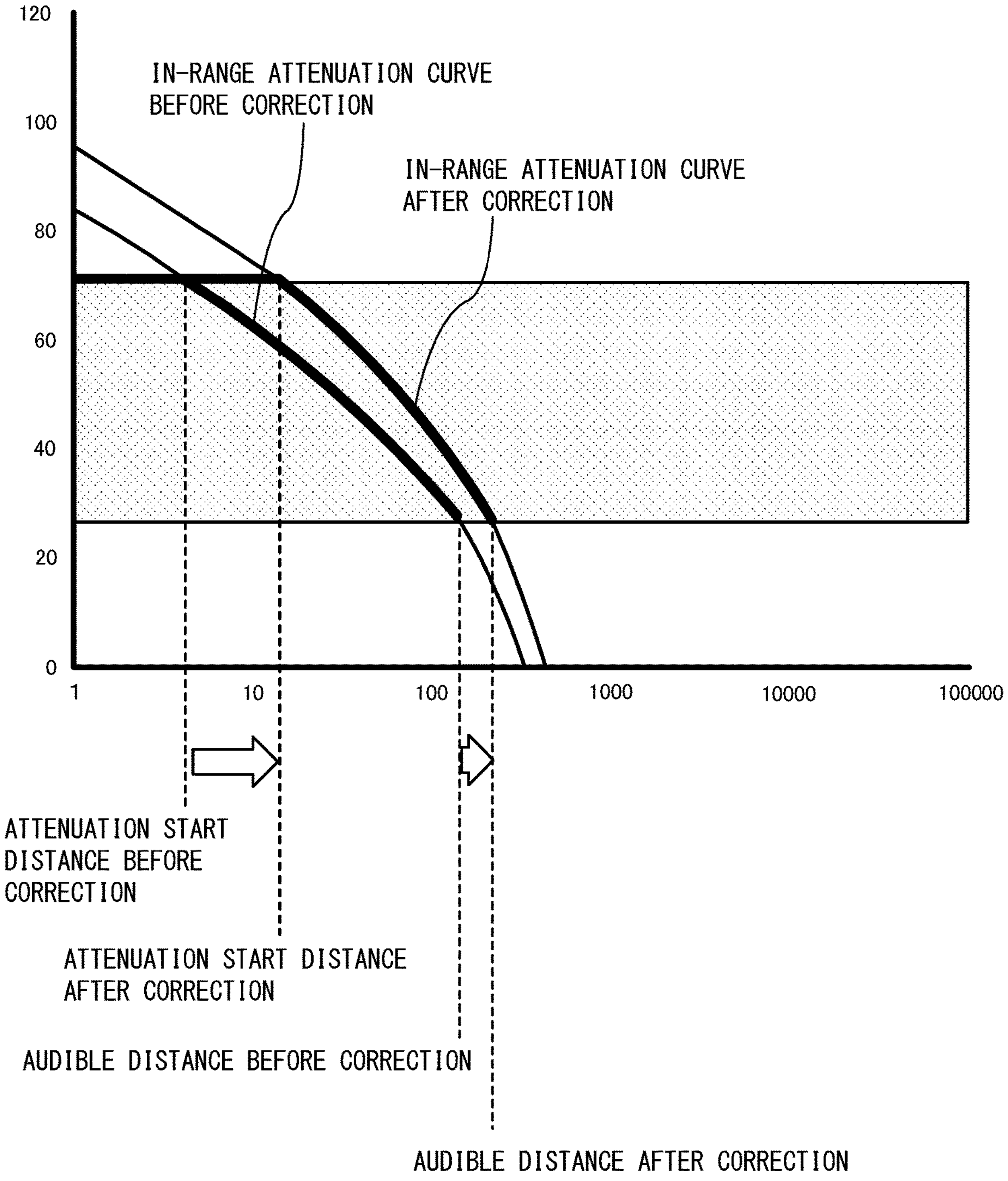
FIG. 12 is a non-limiting example diagram for describing the VSPL correction.

Even when such VSPL correction is performed, in a section in which the sound volume is changing, the sound volume magnitude relationship is maintained as in the above. FIG. 12 shows an example of the in-range attenuation curve of the reference sound, the in-range attenuation curve of the target sound before correction, and the in-range attenuation curve of the target sound after correction. In FIG. 12, it can be seen that the relationship in which the target sound is louder than the reference sound is correctly expressed in a section from the attenuation start distance to the audible distance of the target sound after correction. The difference in the distance at which the sound becomes silent between the reference sound and the target sound can also be expressed.

As described above, in the exemplary embodiment, by making it possible to set the VSPL correction value, room for allowing exceptional individual setting for a specific sound to be heard farther away without increasing the sound volume itself, is given. In this case, the sound volume (amplitude) of the original sound may also be increased. Conversely, by setting a negative VSPL correction value, a specific sound can be set such that the sound becomes inaudible at a closer distance, without decreasing the sound volume itself.

[High Frequency Filter]

Meanwhile, in the real world, there is a phenomenon in which sounds heard from a distance are more attenuated in their high frequency range. In order to express, in a virtual space, such a phenomenon in which only the sound in the high frequency band is attenuated, there is a method using a low-pass filter, for example.

On the other hand, as mentioned briefly in the description of the excess attenuation above, one of the characteristics of the excess attenuation is that sounds in the high frequency band are more easily attenuated than those in the low and mid frequency ranges. That is, while sounds in all the high, mid, and low frequency ranges are attenuated, the range of attenuation in the high frequency range is particularly large. In this respect, considering the expression of distance attenuation that takes the characteristic of the excess attenuation into account, simply using a low-pass filter which does not particularly change sounds in the mid and low frequency ranges is not sufficient to express attenuation in the mid and low frequency ranges in the excess attenuation, which cannot be said to be sufficient as expression of distance attenuation.

Therefore, in the exemplary embodiment, as for expression of the characteristic of the excess attenuation, the attenuation characteristic in the mid and low frequency ranges and the attenuation characteristic in the high frequency range are considered separately. That is, an excess attenuation value for the mid and low frequency ranges and an excess attenuation value for the high frequency range are considered separately. Specifically, a VSPL attenuation curve for the mid and low frequency ranges is considered as a combination of the diffuse attenuation and the excess attenuation as described above, and, for example, the VSPL attenuation curve is calculated with a diffuse attenuation value as "−6 dB/DD" and an excess attenuation value as "−0.1 dB/D". Separately, a VSPL attenuation curve for the high frequency range is calculated with a diffuse attenuation value as "−6 dB/DD" and an excess attenuation value for the high frequency range as "−0.2 dB/D", for example. That is, a value that makes the degree of attenuation slightly higher is set for the high frequency range. In the exemplary embodiment, the excess attenuation value for the mid and low frequency ranges and the excess attenuation value for the high frequency range can be set to any values by the developer.

Figure 13:
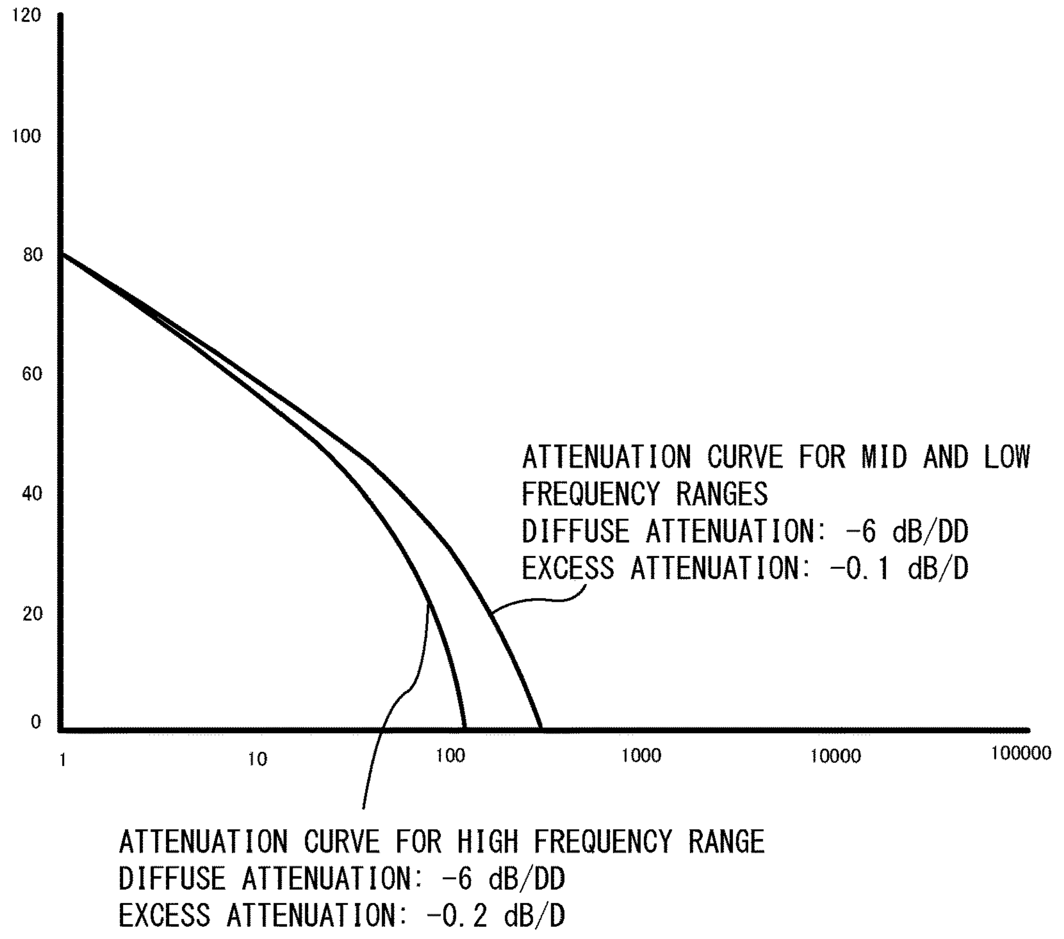
FIG. 13 is a non-limiting example diagram for describing a filter.

Taking the above excess attenuation values as an example, a graph shown in FIG. 13 is obtained, for example. In the graph in FIG. 13, the vertical axis indicates the VSPL, and the horizontal axis indicates the distance. The graph in FIG. 13 shows the VSPL attenuation curve for the high frequency range and the VSPL attenuation curve for the mid and low frequency ranges. As shown in FIG. 13, the VSPL attenuation curve for the high frequency range has a higher excess attenuation value than the VSPL attenuation curve for the mid and low frequency ranges, and thus indicates that the attenuation is completed at a shorter distance. The VSPL attenuation curve for the mid and low frequency ranges is used to determine the distance attenuation characteristic of direct sound as described above. Accordingly, it is made possible to express excess attenuation in the mid and low frequency ranges. On the other hand, excess attenuation in the high frequency range is expressed by applying a low-pass filter. However, when applying the low-pass filter, there is a problem in terms of which distance to start applying the filter. In the exemplary embodiment, the VSPL attenuation curve for the high frequency range is used to determine the distance at which to start applying the filter. The "distance at which to start applying the filter" will be described below.

[Distance at which to Start Applying Filter]

Figure 14:
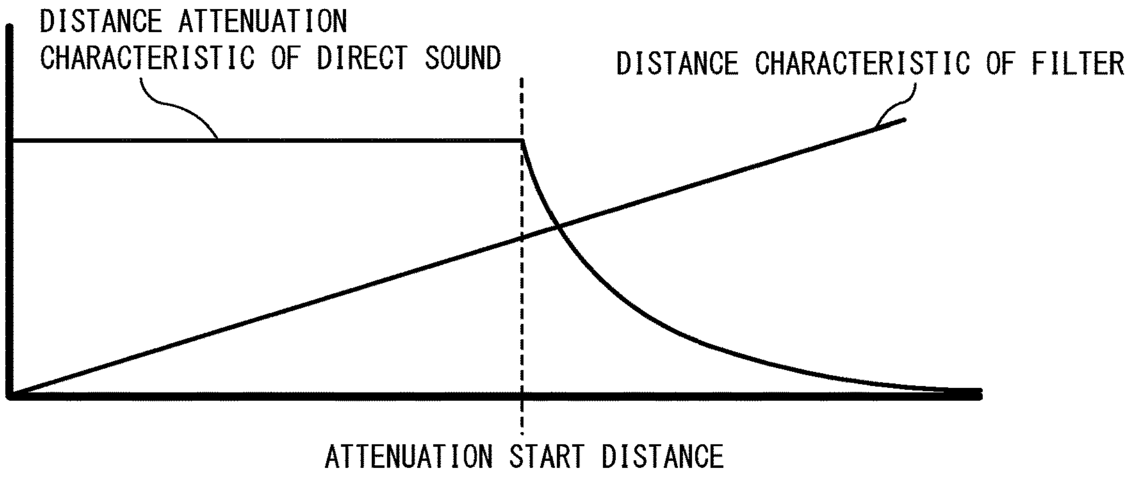
FIG. 14 is a non-limiting example diagram for describing the filter.

Considering the distance attenuation characteristic using the above range (the above in-range attenuation curve), there is a section in which the sound volume is not attenuated. Focusing on the existence of such a section, there is a problem of how to determine the distance at which to start applying the low-pass filter. That is, if the strength at which the low-pass filter is applied is simply determined so as to be in proportion to the distance, the sound may be heard in a manner giving an uncomfortable feeling. For example, the case where a virtual microphone located immediately next to a certain sound source gradually moves away from the sound source, is assumed. FIG. 14 is a graph showing the relationship between the distance attenuation of direct sound and the distance characteristic of the low-pass filter, assuming such a case. This graph is a linear-axis graph in which the vertical axis indicates the sound volume and the strength of the filter and the horizontal axis indicates the distance from the sound source. In FIG. 14, in a section in which the sound volume does not change, that is, at distances equal to or smaller than the attenuation start distance, the sound is heard such that only the portion thereof in the high frequency range is gradually attenuated, by applying the low-pass filter, even though the basic sound volume itself does not change. As a result, there is a possibility that the sound expression may give an auditory uncomfortable feeling to a hearer. In addition, since the low-pass filter is applied before the virtual microphone moves away by the attenuation start distance, when the virtual microphone moves away by the attenuation start distance, the sound may be heard as if the low-pass filter is suddenly and strongly applied. As a result, there is also a possibility that the sound expression gives an uncomfortable feeling, for example, the sound is heard such that the degree of muffling of the sound is suddenly intensified. Therefore, there is a need to adjust the distance at which to start applying the low-pass filter, in order to perform sound expression that gives a less uncomfortable feeling. In this respect, even in the conventional art, the developer may notice such an uncomfortable feeling as a result of trial listening or the like, and may recognize that there is a need to adjust the position at which to start applying the low-pass filter. However, in the conventional art, in such a case, the developer individually adjusts this distance for each sound source through manual operation.

Figure 15:
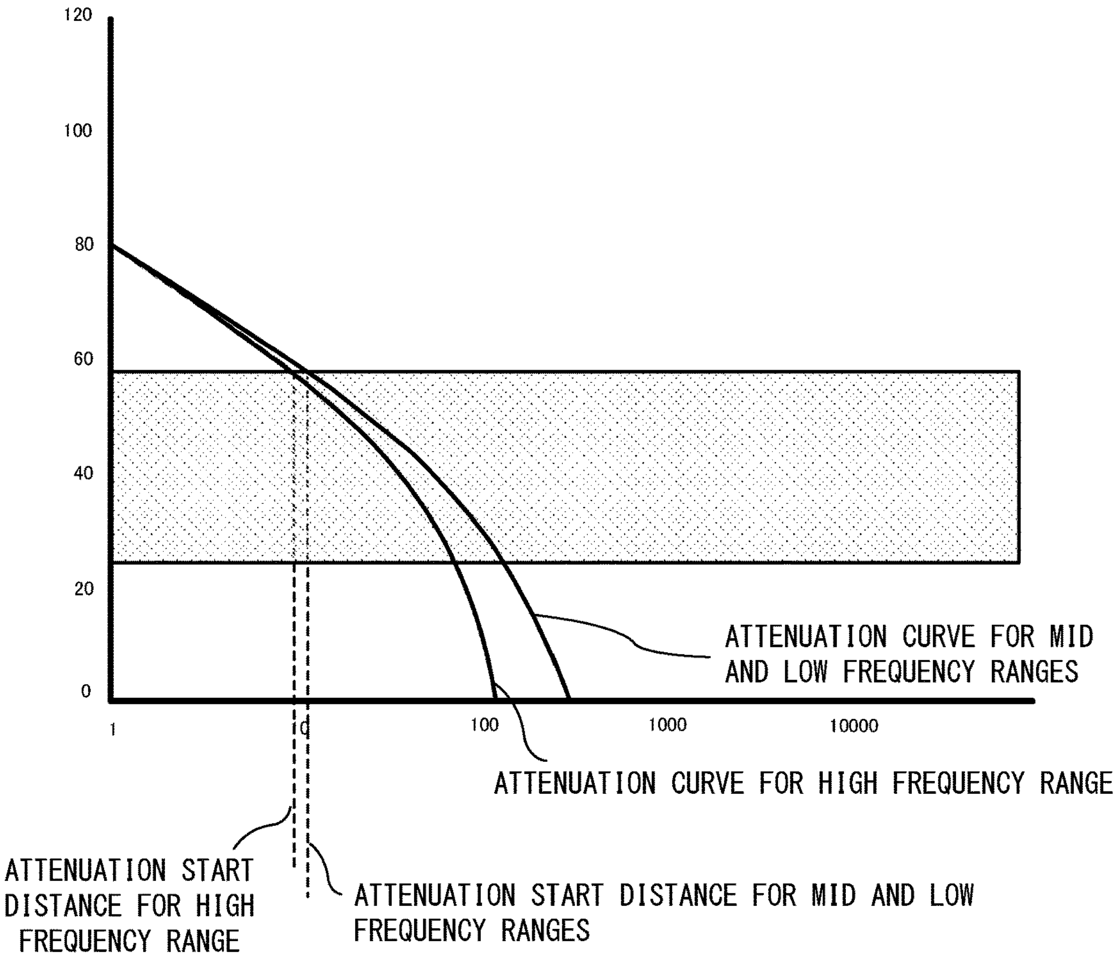
FIG. 15 is a non-limiting example diagram for describing the filter.

In this respect, according to the concept of the exemplary embodiment in which the attenuation characteristic in the high frequency range and the attenuation characteristic in the mid and low frequency ranges are separated as described above, an appropriate distance for each sound source can be semi-automatically determined, as the distance at which to start applying the low-pass filter, by simply determining the attenuation value in the high frequency range as described above. For example, FIG. 15 shows an example in which the above range is applied to the graph in FIG. 13 above. In FIG. 15, focusing on the upper limits of the ranges and the attenuation start distances, the attenuation start distance for the high frequency range is slightly shorter than the attenuation start distance for the mid and low frequency ranges. Here, the attenuation start distance for the high frequency range can be considered to be the distance at which to start applying the low-pass filter, and it can be said that the distance at which to start applying the low-pass filter can be determined on the basis of the upper limit of the range and the VSPL attenuation curve for the high frequency range. As a result, a distance slightly shorter than the distance at which the attenuation of direct sound begins is determined as the distance at which to start applying the low-pass filter. When the distance at which to start applying the low-pass filter is determined, the gradient of the filter characteristic in the graph is determined on the basis of the excess attenuation value for the high frequency range. That is, by setting the excess attenuation value for the high frequency range as described above, the distance at which the filter is fully applied, in other words, the end point, is determined, so that when the distance at which to start applying the low-pass filter, in other words, the start point, is determined, the gradient of the filter characteristic is also determined by connecting these points.

Figure 16:
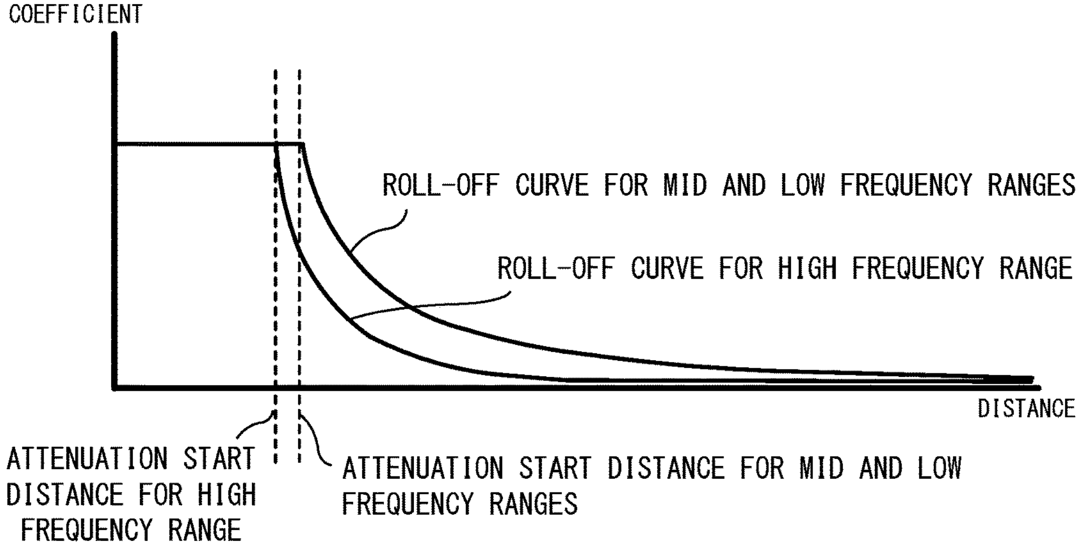
FIG. 16 is a non-limiting example diagram for describing the filter.

When considering the contents of FIG. 15 shown on a linear axis, a graph shown in FIG. 16 is obtained. In FIG. 16, the attenuation characteristics in the mid and low frequency ranges and the high frequency range are shown by roll-off curves, respectively. The expression of the attenuation characteristic in the high frequency range in the exemplary embodiment can be said to be expression of the roll-off curve for the high frequency range by gradually applying the low-pass filter to the roll-off curve for the mid and low frequency ranges in FIG. 16. Therefore, it can also be said that the above distance at which to start applying the low-pass filter corresponds to the point of intersection with the upper limit of the range.

Figure 17:
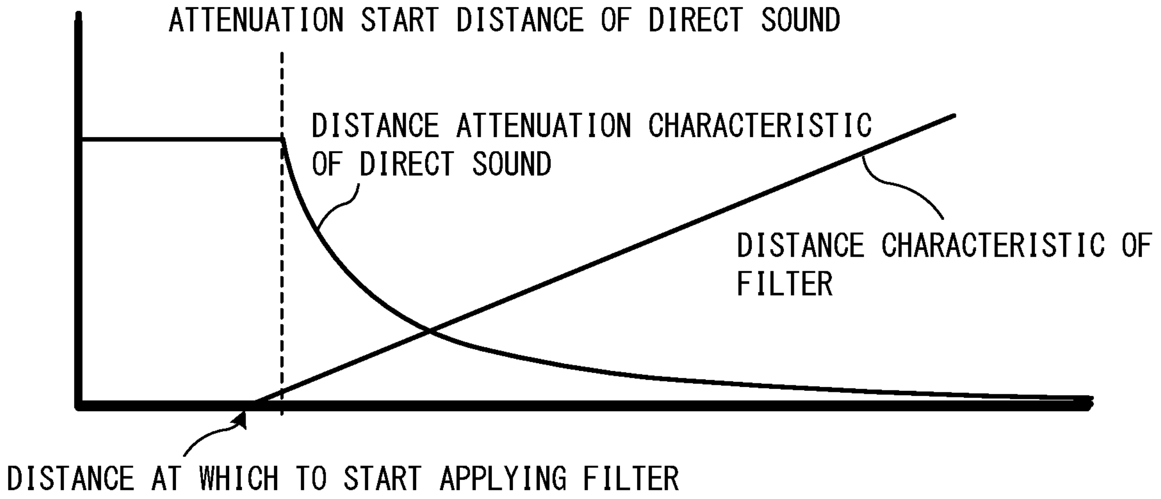
FIG. 17 is a non-limiting example diagram for describing the filter.

FIG. 17 is a graph showing the distance attenuation characteristic of direct sound determined on the basis of the VSPL attenuation curve for the mid and low frequency ranges and the distance characteristic of the low-pass filter on a linear axis. In FIG. 17, the horizontal axis indicates the distance, and the vertical axis indicates the sound volume of the direct sound and the strength of the filter. As shown in FIG. 17, the low-pass filter begins to be applied at a distance slightly shorter than the attenuation start distance of the direct sound, and after this distance, the filter becomes stronger in proportion to an increase in the distance from the sound source. In addition, it is also shown that the low-pass filter is not applied up to the distance slightly shorter than the attenuation start distance of the direct sound. Accordingly, an uncomfortable feeling caused by only a high frequency component being attenuated when the filter begins to be applied even at a close distance from the sound source, can be suppressed.

By determining the distance at which to start applying the low-pass filter on the basis of the attenuation characteristic in the high frequency range as described above, the characteristic of the excess attenuation can be expressed more appropriately while an uncomfortable feeling is suppressed. For example, the graph in FIG. 15 above shows that the VSPL attenuation curve for the high frequency range reaches the audible distance (lower limit of the range) before the VSPL attenuation curve for the mid and low frequency ranges. By determining the distance characteristic of the filter on the basis of the attenuation curve for the high frequency range, sounds in a distance zone slightly before the audible distance are expressed as if a high-pitched sound has completely fallen off, so that it can be said that a feeling of a "distant sound" can be expressed more appropriately.

[Details of Information Processing of Exemplary Embodiment]

In the exemplary embodiment, by using the VSPL, the diffuse attenuation, the excess attenuation, the range, the high frequency range filter, etc., as described above, it is made possible to design sounds for which more natural distance attenuation can be expressed in the virtual space. Hereinafter, an example of the information processing realized as a development tool based on the above-described principles will be described.

[Data to be Used]

Figure 18:
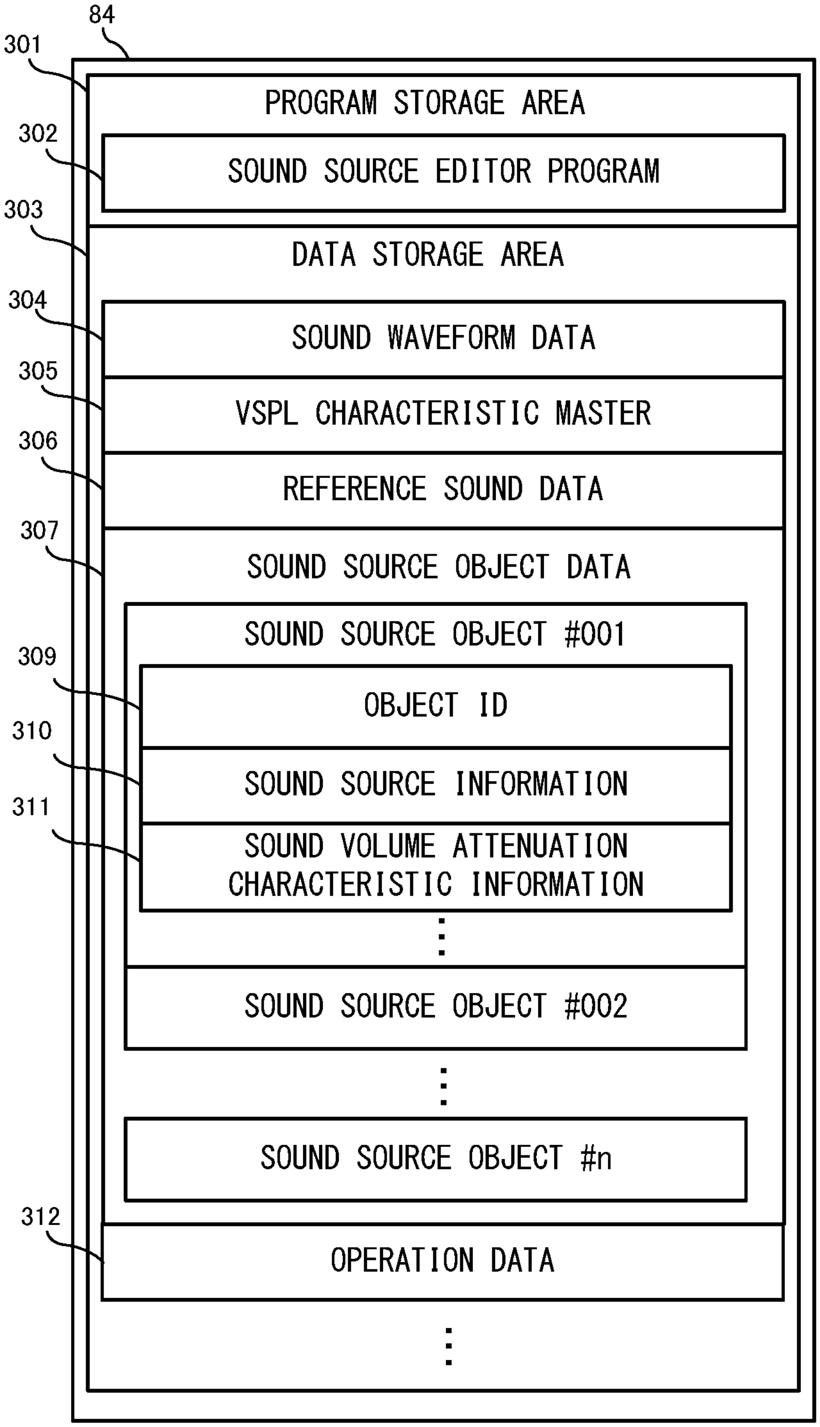
FIG. 18 illustrates a memory map showing a non-limiting example of various kinds of data stored in a storage section 84.

First, various kinds of data to be used in this processing will be described. FIG. 18 illustrates a memory map showing an example of various kinds of data stored in the storage section 84 of the information processing apparatus 2. The storage section 84 includes a program storage area 301 and a data storage area 303. In the program storage area 301, a sound source editor program 302 is stored. In the data storage area 303, sound waveform data 304, a VSPL characteristic master 305, reference sound data 306, sound source object data 307, operation data 312, etc., are stored.

The sound source editor program 302 is a program for setting the distance attenuation characteristic of a sound volume on the basis of the principles described above. Specifically, the sound source editor program 302 is a program for executing processing shown in flowcharts in FIG. 20, FIG. 22, and FIG. 23 described later.

The sound waveform data 304 is waveform data of each sound to be used in the virtual space.

The VSPL characteristic master 305 is a database that defines an attenuation characteristic (the above VSPL attenuation curve) for each VSPL as described above. FIG. 19 illustrates an example of the data structure of the VSPL characteristic master 305. The VSPL characteristic master 305 is composed of a set of records each including at least items such as a VSPL value 3051, a silent-deemed sound volume 3052, a diffuse attenuation value 3053, a mid and low frequency range excess attenuation value 3054, and a high frequency range excess attenuation value 3055. The VSPL value 3051 is a value that specifies a defined VSPL. The silent-deemed sound volume 3052 is information that defines the sound volume deemed as silent as described above. The diffuse attenuation value 3053 indicates a diffuse attenuation value per double distance as described above. The mid and low frequency range excess attenuation value 3054 indicates the above excess attenuation value assuming the mid and low frequency bands. The high frequency range excess attenuation value 3055 indicates the above excess attenuation value assuming the high frequency band. These values are predefined by the developer or others. In addition, each value can be set to any value by the developer, and can be edited. Giving supplementary description regarding the VSPL value 3051, the case where VSPL characteristics are predefined in 20 dB increments is exemplified in the exemplary embodiment. For a VSPL that is not defined, the above value is calculated by interpolation based on the predefined VSPLs in processing described later.

Referring back to FIG. 18, the reference sound data 306 is data indicating the reference sound as described above. The contents of this data are also defined in advance by the developer. Specifically, the reference sound data 306 includes information for specifying the sound volume (LKFS), audible distance (virtual meters), VSPL (dB), etc., of the waveform data to be used as the reference sound.

The sound source object data 307 is data that can be outputted and stored by the processing of the exemplary embodiment, and is data that defines a plurality of sound source objects that can be placed in the virtual space. For each sound source object, at least an object ID 309, sound source information 310, and sound volume attenuation characteristic information 311 are included. The object ID 309 is information for uniquely identifying the sound source object. The sound source information 310 is information that specifies waveform data associated as a sound emitted by the sound source object. The sound volume attenuation characteristic information 311 is information indicating how the sound volume of the sound related to the sound source object is distance-attenuated. That is, the sound volume attenuation characteristic information 311 is information indicating the relationship between distance and the degree of attenuation of the sound volume. In addition, the sound volume attenuation characteristic information 311 also includes information regarding the above described characteristic and distance at which to start applying the low-pass filter.

The operation data 312 is data indicating the contents of operations performed on an input device 4. The contents of the operation data 312 are updated at a predetermined cycle on the basis of a signal from the input device 4.

[Details of Processing Executed by Processor 81]

The information processing according to the exemplary embodiment will be described in detail next. Here, processing regarding setting the distance attenuation characteristic of a sound volume for a predetermined target sound and storing data thereof will be mainly described, and the detailed description of other processing is omitted.

Figure 20:
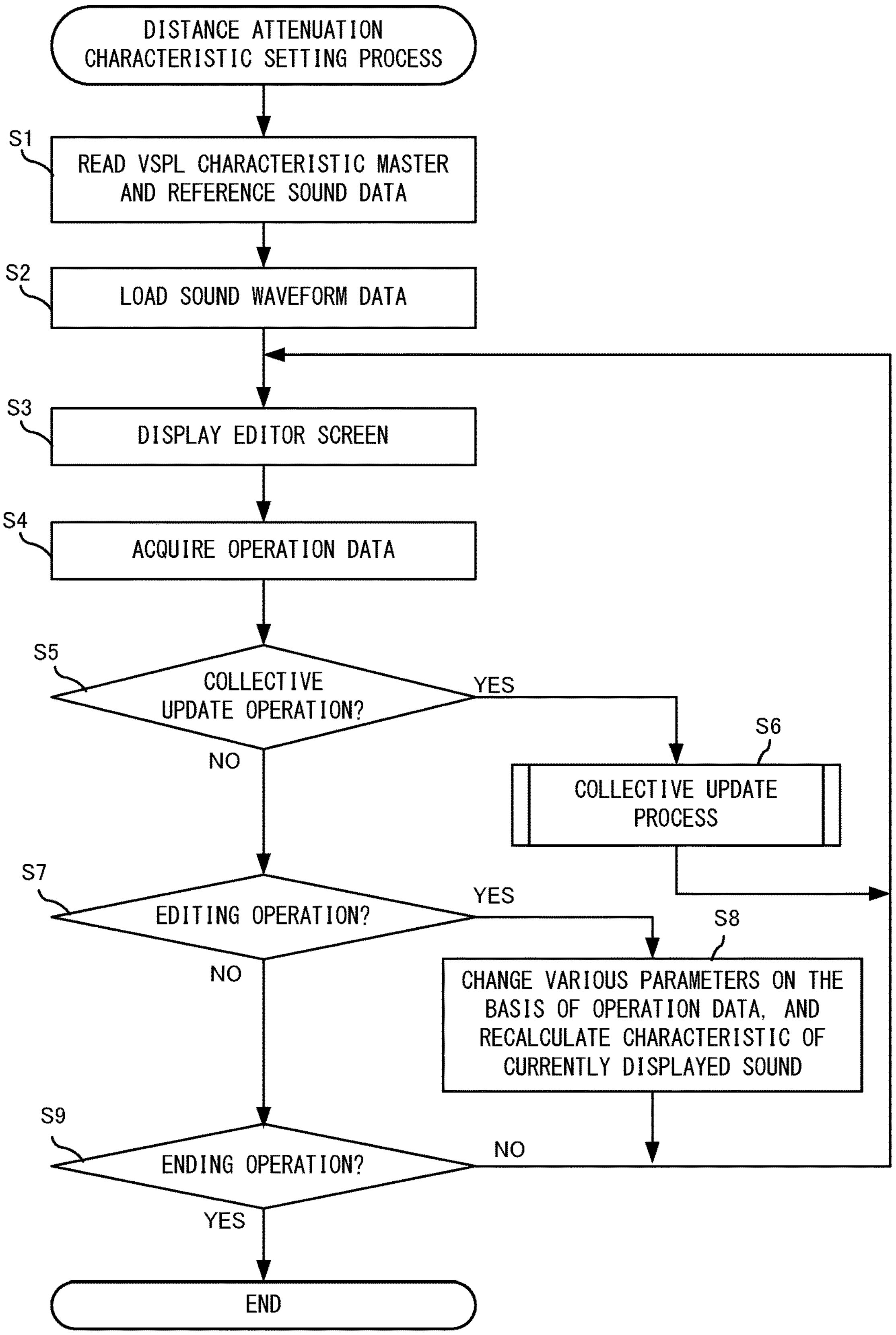
FIG. 20 is a non-limiting example flowchart showing the details of information processing according to an exemplary embodiment.

FIG. 20 is a flowchart showing the details of a distance attenuation characteristic setting process according to the exemplary embodiment. In the exemplary embodiment, the flowchart is realized by one or more processors reading and executing the above program stored in one or more memories. A process loop of steps S3 to S9 is repeatedly executed every frame period. In addition, the flowchart is merely an example of the processing. Therefore, the order of each process step may be changed as long as the same result is obtained. In addition, the values of variables and thresholds used in determination steps are also merely examples, and other values may be used as necessary.

In FIG. 20, when the program is started, first, in step S1, the processor 81 reads the VSPL characteristic master 305 and the reference sound data 306.

Next, in step S2, the processor 81 loads the sound waveform data 304 to be processed, into the storage section 84. For example, when the user designates a folder in which a plurality of sound waveform data 304 are stored, all the sound waveform data 304 in the folder are loaded.

Figure 21:
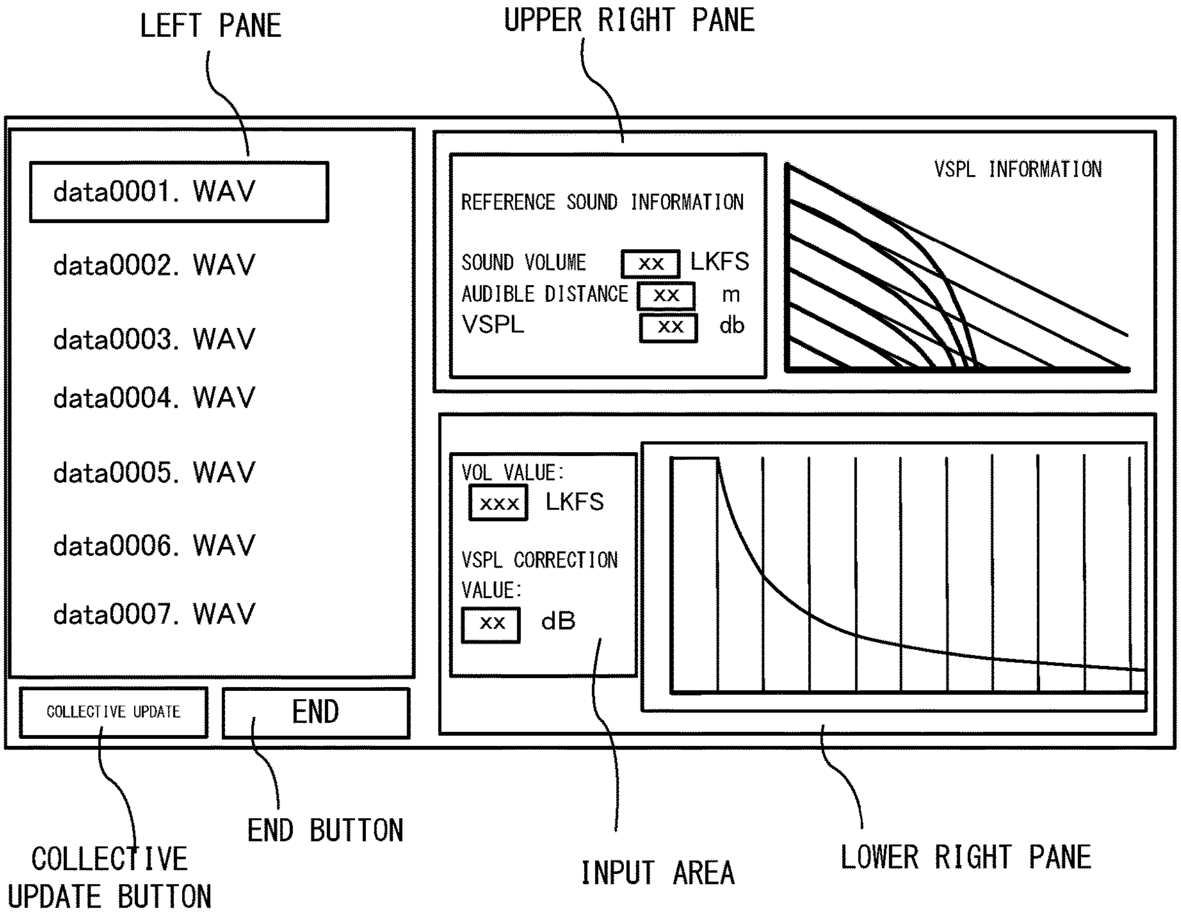
FIG. 21 is a non-limiting example of a screen displayed by the information processing according to the exemplary embodiment.

Next, in step S3, the processor 81 generates and displays an editor screen. The user can use the editor screen to perform operations for editing each of the above loaded data and operations for collectively calculating and storing distance attenuation characteristics for the plurality of sound waveform data 304. The contents of the editor screen may be any contents, and a screen shown in FIG. 21 is displayed, for example. In the screen example in FIG. 21, a display region is divided into three parts: a left pane, an upper right pane, and a lower right pane. In the left pane, a list of the sound waveform data 304 loaded in step S2 above is displayed. The user can select certain waveform data as a display target from the list. When the user selects certain waveform data here, a roll-off curve indicating the distance attenuation characteristic of the waveform data of the display target is displayed in the lower right pane. The distance attenuation characteristic is calculated by executing a characteristic calculation process in step S22 described later with the selected waveform data as a processing target.

In the lower right pane, an input area in which the currently selected waveform data can be edited is also displayed. The user can edit the contents of the currently selected waveform data by performing a predetermined operation. The example of FIG. 21 shows that the Vol value of the waveform data and the above VSPL correction value can be inputted. When the contents of the waveform data are changed, the distance attenuation characteristic of the sound volume for the waveform data is recalculated on the basis of the changed contents, and the display contents are updated.

In the upper right pane of the editor screen, reference sound information indicating the contents read from the reference sound data 306, and VSPL information indicating a VSPL attenuation curve indicating the contents read from the VSPL characteristic master 305 are displayed. In addition, a roll-off curve related to the currently edited or selected waveform data may be displayed in a superimposed manner. The user can change the specified waveform data to be used as a reference sound, or can change the parameter of the reference sound, by performing a predetermined operation. In addition, the user can further change each parameter defined in the loaded VSPL characteristic master 305 with reference to the display of the VSPL information by performing a predetermined operation.

Moreover, a collective update button and an end button are also displayed at the lower side of the left pane. The user can execute a process (described later) for collectively calculating and storing distance attenuation characteristics for all the loaded sound waveform data 304, by operating the collective update button. At this time, if a parameter regarding the reference sound or each parameter defined in the VSPL characteristic master 305 has been changed, the characteristic calculation process is executed using the changed parameter. In addition, it may be possible to perform operations for updating and storing only the distance attenuation characteristic related to the currently selected waveform data. Moreover, the user can end the distance attenuation characteristic setting process by operating the end button.

Referring back to FIG. 20, when the editor screen is displayed, next, in step S4, the processor 81 acquires the operation data 312.

Next, in step S5, the processor 81 determines whether or not the collective update button has been operated, on the basis of the operation data 312. If the collective update button has been operated (YES in step S5), the processor 81 executes a collective update process in step S6.

Figure 22:
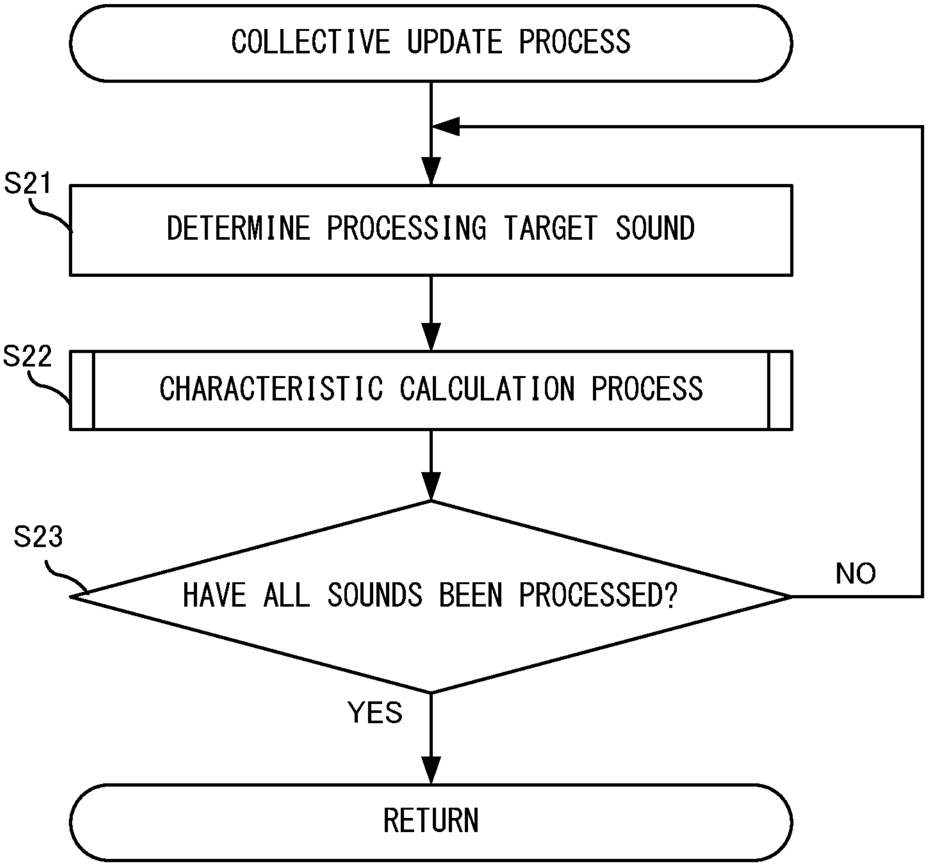
FIG. 22 is a non-limiting example flowchart showing the details of a collective update process.

FIG. 22 is a flowchart showing the details of the collective update process. First, in step S21, the processor 81 determines one sound waveform data to be processed (hereinafter, referred to as processing target sound) out of the plurality of sound waveform data 304 loaded above.

Figure 23:
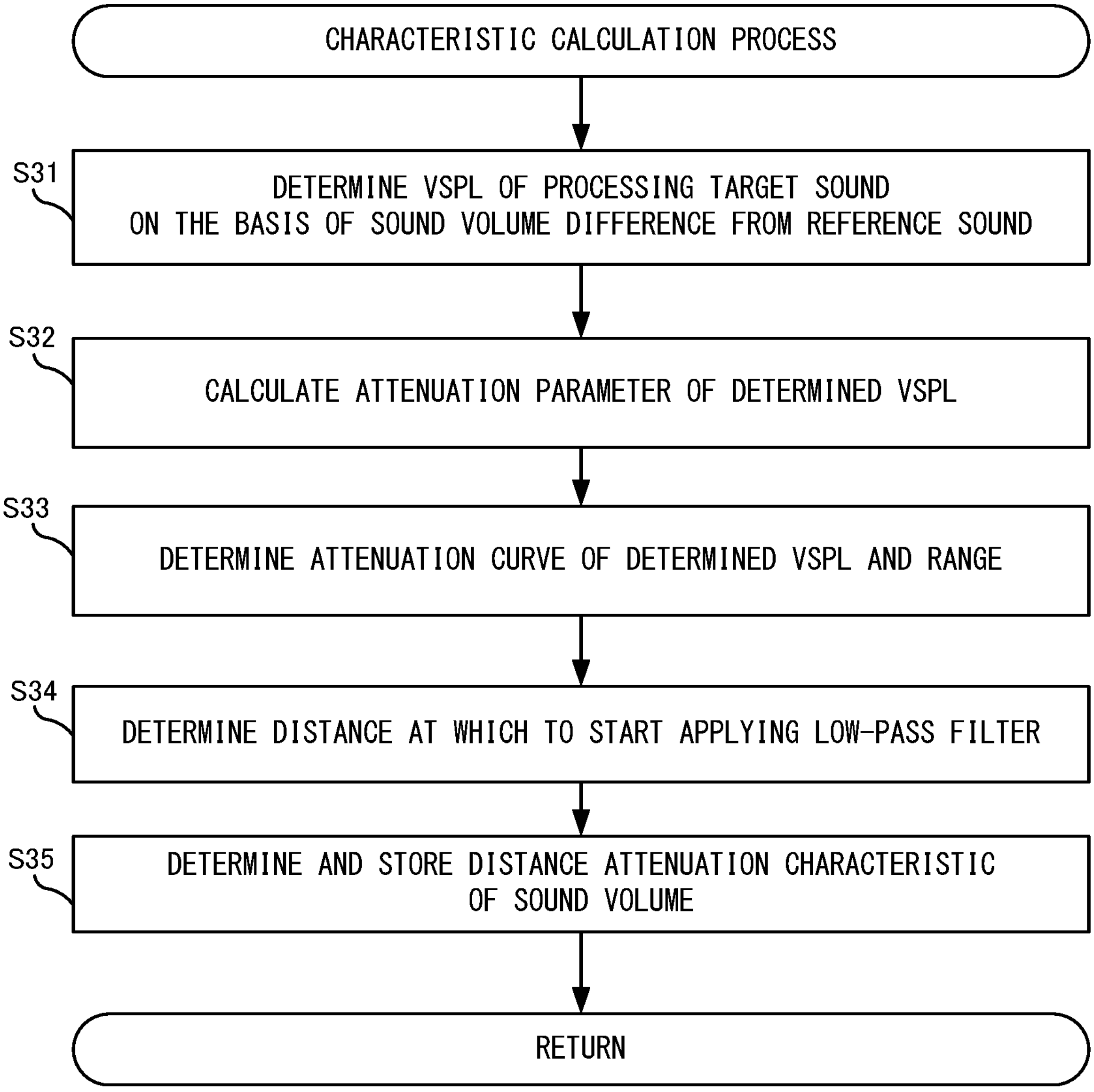
FIG. 23 is a non-limiting example flowchart showing the details of a characteristic calculation process.

Next, in step S22, the processor 81 executes the characteristic calculation process for calculating the above distance attenuation characteristic for the processing target sound. FIG. 23 is a flowchart showing the details of the characteristic calculation process. First, in step S31, the processor 81 determines the VSPL of the processing target sound on the basis of the sound volume difference between the reference sound and the processing target sound.

Next, in step S32, the processor 81 calculates the above-described diffuse attenuation value, mid and low frequency range excess attenuation value, and high frequency range excess attenuation value (hereinafter, collectively referred to as attenuation parameter) on the basis of the VSPL of the processing target sound and the VSPL characteristic master 305. Specifically, the processor 81 reads the attenuation parameter for each VSPL defined in the VSPL characteristic master 305. Then, the processor 81 calculates the attenuation parameter corresponding to the VSPL of the target sound through interpolation calculation using the read attenuation parameters. The calculation method of the interpolation calculation is a calculation method in which, when the VSPL is a value defined in the VSPL characteristic master 305, the calculation result is the same as the value of each attenuation parameter defined in the VSPL characteristic master 305.

Next, in step S33, the processor 81 determines the above-described VSPL attenuation curve on the basis of the calculated attenuation parameter. In addition, the processor 81 determines the above-described range on the basis of the "sound volume deemed as silent" set for each VSPL. Furthermore, the processor 81 calculates the above-described in-range attenuation curve on the basis of the range. That is, the distance attenuation characteristic of the VSPL is determined such that a section in which the sound volume is not attenuated, a section in which the sound volume is attenuated, and a section in which there is silence, exist.

Next, in step S34, the processor 81 calculates the above-described VSPL attenuation curve for the high frequency range on the basis of the calculated high frequency range excess attenuation value. Then, the processor 81 determines the above-described distance at which to start applying the low-pass filter, on the basis of the attenuation curve for the high frequency range and the range.

Next, in step S35, the processor 81 determines the distance attenuation characteristic of the sound volume of the processing target sound on the basis of the calculated in-range attenuation curve. Specifically, first, the processor 81 calculates the distance attenuation characteristic corresponding to the above-described roll-off curve. Next, the processor 81 also calculates the characteristic of the low-pass filter on the basis of the distance at which to start applying the low-pass filter and the high frequency range excess attenuation value. Next, the processor 81 stores the calculated distance attenuation characteristic and the calculated characteristic of the low-pass filter in association with the processing target sound. Specifically, information indicating the processing target sound is set as the sound source information 310, information indicating the distance attenuation characteristic of the sound volume and the characteristic of the low-pass filter calculated in the above process is set as the sound volume attenuation characteristic information 311, and these pieces of information are stored as data of a sound source object. The "information indicating the distance attenuation characteristic" may be, for example, information indicating a function corresponding to the roll-off curve, a roll-off coefficient, a reference distance, etc.

When the above process is ended, the processor 81 ends the characteristic calculation process.

Referring back to FIG. 22, when the characteristic calculation process for the processing target sound is ended, next, in step S23, the processor 81 determines whether or not the characteristic calculation process has been performed for all the sound waveform data 304. If there is still unprocessed sound waveform data 304 (NO in step S23), the processor 81 returns to step S21 above, and repeats the processing. On the other hand, if the characteristic calculation process has been completed for all the sound waveform data 304 (YES in step S23), the processor 81 ends the collective update process.

Referring back to FIG. 20, when the collective update process is ended, the processor 81 returns to step S3 above, and repeats the processing.

On the other hand, as a result of the determination in step S5 above, if the collective update button has not been operated (NO in step S5), in step S7, the processor 81 determines whether or not a predetermined editing operation has been performed, on the basis of the operation data 312. As a result of the determination, if the editing operation has been performed (YES in step S7), in step S8, the processor 81 changes various parameters on the basis of the operation contents indicated by the operation data 312. Specifically, if an operation for changing a parameter related to the reference sound has been performed, the processor 81 performs a process of changing the contents of the reference sound data 306 as appropriate on the basis of the content of the operation. If an operation for changing the contents of the VSPL characteristic master 305 has been performed, the processor 81 performs a process of changing the contents of the VSPL characteristic master 305 as appropriate on the basis of the content of the operation. In addition, if an operation for selecting sound waveform data from the list displayed in the left pane has been performed, the processor 81 executes the characteristic calculation process in step S22 above, with the selected waveform data as a processing target sound, and updates the display contents such as a roll-off curve on the basis of the results of the characteristic calculation process. That is, the processor 81 calculates the distance attenuation characteristic of the selected waveform data using the characteristic calculation process in step S22 above. In addition, if an operation for changing a parameter related to the currently displayed waveform data has been performed, a process of changing the parameter related to the waveform data is performed on the basis of the content of the operation. For example, if an operation for changing the above Vol value has been performed, the processor 81 changes the sound volume value of the waveform data. In addition, along with this, the processor 81 recalculates the amplitude of the waveform. For example, if an operation for setting a VSPL correction value has been performed, the processor 81 changes the VSPL correction value of the waveform data on the basis of the content of the operation. Although not shown, the waveform itself based on the waveform data may be directly editable on the editor screen. Furthermore, when various parameters have been changed as described above, the processor 81 executes the characteristic calculation process in step S22 above, using the changed various parameters. Accordingly, the distance attenuation characteristic related to the waveform data is recalculated.

After step S8 above, the processor 81 returns to step S3 above, and repeats the processing. The editor screen displayed in this case is an editor screen in which the parameters changed by the above editing operations and the contents recalculated using the changed parameters are reflected. For example, when various parameters or waveform data have been changed, the shape of the roll-off curve is updated. In other words, the editor screen is displayed such that the contents of the editing operations are reflected in real time.

On the other hand, as a result of the determination in step S7 above, if no editing operation has been performed (NO in step S7), next, in step S9, the processor 81 determines whether or not the end button has been operated, on the basis of the operation data 312. As a result of the determination, if the end button has not been operated (NO in step S9), the processor 81 returns to step S3 above, and repeats the processing. On the other hand, if the end button has been operated (YES in step S9), the processor 81 ends the distance attenuation characteristic setting process.

This is the end of the detailed description of the distance attenuation characteristic setting process according to the exemplary embodiment.

As described above, in the exemplary embodiment, the distance attenuation characteristics of the sound volumes of virtual sounds to be used in the virtual space can be set semi-automatically under a unified rule. By using the sounds set as described above, sound distance attenuation giving a less uncomfortable feeling and having a sense of unity can be expressed in the virtual space.

In the exemplary embodiment, a value of the VSPL of each waveform data and a distance, in the virtual space, at which the sound volume is changed (attenuated) can be determined on the basis of the subjectivity of the developer, but the attenuation characteristic itself can be determined semi-automatically by imitating the physical characteristics in the real world.

[Modifications]

In the above embodiment, the example in which the sound volume deemed as silent is set for each VSPL has been described. In another exemplary embodiment, a common sound volume may be applied as the sound volume deemed as silent. That is, the same sound volume may be applied as the sound volume deemed as silent, regardless of the value of the VSPL.

As for the VSPL correction, the example in which the waveform of the original waveform data itself is not changed, that is, the sound volume itself is not changed, has been described above. In this respect, in another exemplary embodiment, the waveform is increased to some extent and then VSPL correction may be performed as described above. For example, when the above VSPL correction is performed for a sound having a loudness of "−20 LKFS", the waveform may be increased such that the loudness of the sound is "−18 LKFS", and then the VSPL of the sound having a loudness of "−18 LKFS" may be corrected.

In the above example, as the method for determining the lower limit of the range, the method in which the "sound volume deemed as silent" is directly specified in the VSPL characteristic master 305 has been described. In addition, it may also be possible to specify the lower limit of the range in the form of the above "audible distance". Then, the above deemed-silent VSPL may be calculated on the basis of the audible distance. It is also possible to directly specify the deemed-silent VSPL. In any case, since the audible distance and the deemed-silent VSPL are determined in conjunction with each other, it is possible for the developer to set the lower limit of the range as a "distance" or a "VSPL" when determining the lower limit, which can provide an environment that makes it easy for the developer to design according to their own sensibilities.

In addition to the mode in which a value corresponding to the lower limit of the range is directly specified, it may be possible to semi-automatically set a value corresponding to the lower limit of the range, on the basis of a pre-specified condition. For example, a "limit reach distance" may be specified in advance, and the above deemed-silent VSPL may be calculated on the basis of this distance.

In the above example, as for the filter applied to the sounds, the example in which the low-pass filter is used to express the high frequency range characteristic in the excess attenuation has been described. The type of the filter applied to the sound waveform data is not limited to the low-pass filter, and other types of filters may be used as appropriate. In this case, the strength at which the filter is applied may be determined on the basis of the VSPL of the sound source and the distance from the sound source. Accordingly, the strength of the filter can be adjusted in accordance with the loudness of the virtual sound and the distance from the sound source, so that richer expression of distance attenuation is enabled.

In the above embodiment, the example in which the above VSPL correction can be used when it is desired to make a specific sound reach a location farther than the audible distance, has been described. In this example, the reference distance in the above roll-off curve is extended by increasing the VSPL, and as a result, the sound is made to reach a farther location. In this respect, in another exemplary embodiment, for each sound, it may be possible to set the lower limit of the range to be extended. That is, for a specific sound, it may be possible to further decrease the VSPL as the lower limit of the range. For example, it is assumed that there are two sounds having the same VSPL of "60 dB". Then, it is assumed that the VSPL corresponding to the lower limit of the range is "20 dB" based on the sound volume deemed as silent which is defined as the parameter of the VSPL of "60 dB" in the above VSPL characteristic master 305. In this case, by setting a lower limit extension for only one sound, it may be possible to set the VSPL corresponding to the lower limit of the range, for example, to "18 dB" for this sound. In this case as well, a specific sound can be exceptionally made to reach a farther location.

As the processing described in the above embodiment, a part of the development process at the stage of game development has been exemplified. The present disclosure is not limited thereto, and, for example, processing of calculating and setting the above described distance attenuation characteristic of the sound volume may be executed as game processing. In this case, for example, the VSPL characteristic master 305 may be stored as one of game data. Then, for example, at the timing of placing a sound source object in the virtual space, the distance attenuation characteristic of the sound volume may be calculated and set on the basis of the VSPL characteristic master 305 and the Vol value set for the sound source object.

In the game processing, a process of selectively using a plurality of VSPL characteristic masters 305 may be performed. For example, in the case where a plurality of virtual worlds having different physical laws are used in the game, VSPL characteristic masters 305 respectively corresponding to the virtual worlds may be selectively used.

In the above embodiment, the case where the series of information processing is performed in the single information processing apparatus 2 has been described. However, in another embodiment, the above series of processing may be performed in an information processing system that includes a plurality of information processing apparatuses. For example, in an information processing system that includes a terminal side apparatus and a server side apparatus capable of communicating with the terminal side apparatus via a network, a part of the series of processing may be performed by the server side apparatus. Alternatively, in an information processing system that includes a terminal side apparatus and a server side apparatus capable of communicating with the terminal side apparatus via a network, a main process of the series of processing may be performed by the server side apparatus, and a part of the series of processing may be performed by the terminal side apparatus. Still alternatively, in the information processing system, a server side system may include a plurality of information processing apparatuses, and a process to be performed in the server side system may be divided and performed by the plurality of information processing apparatuses.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein an information processing program causing a computer of an information processing apparatus to provide execution comprising:

setting a first parameter associated with a virtual sound pressure level and virtually indicating loudness of a sound, for each of a plurality of sound data, wherein the first parameter corresponds to a value indicated at a distance at which a second parameter serves as a reference, the second parameter indicates loudness of a virtual sound in a virtual space and is attenuated in accordance with a distance from a position of a sound source to a virtual microphone in the virtual space; and for each of the sound data, on the basis of at least second parameter attenuation characteristic data indicating a relationship, between a value of the second parameter and the distance, varied in accordance with a value of the first parameter, and the first parameter set in the sound data, setting a sound volume attenuation characteristic used when a sound volume at which the sound data is outputted is attenuated in accordance with the distance from the sound source associated with the sound data, wherein the sound volume attenuation characteristic indicates a relationship between the distance and a degree of attenuation of the sound volume.

2. The non-transitory computer-readable storage medium according to claim 1, wherein the information processing program further causes the computer to provide execution comprising setting the value of the first parameter of each of the sound data on the basis of at least an amplitude of a waveform of the sound data.

3. The non-transitory computer-readable storage medium according to claim 2, wherein the information processing program further causes the computer to provide execution comprising setting, as the first parameter of each of the sound data, a value obtained by correcting the value set on the basis of the amplitude of the waveform with a further specified predetermined value.

4. The non-transitory computer-readable storage medium according to claim 1, wherein the information processing program further causes the computer to, for each of the sound data, provide execution comprising:

setting an upper limit and a lower limit for the second parameter in a relationship between the distance and the second parameter corresponding to the first parameter set in the sound data in the second parameter attenuation characteristic data; and setting the sound volume attenuation characteristic such that the sound volume is not attenuated at the distance equal to or smaller than a first distance at which the second parameter is the upper limit, the sound is silent at the distance equal to or larger than a second distance at which the second parameter is the lower limit, and when the distance is between the first distance and the second distance, the sound volume is attenuated at a degree of attenuation based on a relationship between the second parameter and the distance.

5. The non-transitory computer-readable storage medium according to claim 4, wherein the information processing program further causes the computer to provide execution comprising setting, as the lower limit, a value of the second parameter deemed as silent and set on the basis of a pre-specified condition.

6. The non-transitory computer-readable storage medium according to claim 4, wherein the information processing program further causes the computer to provide execution comprising setting, as the upper limit, a value obtained by adding, to the lower limit, a value obtained by subtracting a value corresponding to a pre-specified sound volume deemed as silent from a value based on an amplitude of the sound data.

7. The non-transitory computer-readable storage medium according to claim 1, wherein the second parameter in the second parameter attenuation characteristic data indicates a relationship in which second attenuation corresponding to the distance is performed in addition to first attenuation corresponding to a square of the distance.

8. The non-transitory computer-readable storage medium according to claim 4, wherein the second parameter in the second parameter attenuation characteristic data indicates a relationship in which second attenuation corresponding to the distance is performed in addition to first attenuation corresponding to a square of the distance, and the information processing program further causes the computer to provide execution comprising setting a filter characteristic in which a predetermined filter is applied to a waveform of the sound data at a strength corresponding to the distance at the distance equal to or larger than a third distance at which the second parameter is the upper limit, on the basis of second parameter attenuation characteristic data, for a high frequency range, indicating a relationship in which the second attenuation is added more strongly than attenuation indicated by the second parameter attenuation characteristic data.

9. The non-transitory computer-readable storage medium according to claim 8, wherein the filter includes a low-pass filter.

10. The on-transitory computer-readable storage medium according to claim 1, wherein the information processing program further causes the computer to provide execution comprising setting a filter characteristic in which a predetermined filter is applied to a waveform of the sound data at a strength corresponding to the distance, on the basis of the first parameter.

11. The non-transitory computer-readable storage medium according to claim 1, wherein the first parameter and the second parameter each indicate the virtual sound pressure level in the virtual space.

12. An information processing method executed by a computer configured to control an information processing apparatus, the information processing method comprising:

setting a first parameter associated with a virtual sound pressure level and virtually indicating loudness of a sound, for each of a plurality of sound data, wherein the first parameter corresponds to a value indicated at a distance at which a second parameter serves as a reference, the second parameter indicates loudness of a virtual sound in a virtual space and is attenuated in accordance with a distance from a position of a sound source to a virtual microphone in the virtual space; and for each of the sound data, on the basis of at least second parameter attenuation characteristic data indicating a relationship, between a value of the second parameter and the distance, varied in accordance with a value of the first parameter, and the first parameter set in the sound data, setting a sound volume attenuation characteristic used when a sound volume at which the sound data is outputted is attenuated in accordance with the distance from the sound source associated with the sound data, wherein the sound volume attenuation characteristic indicates a relationship between the distance and a degree of attenuation of the sound volume.

13. The information processing method according to claim 12, further comprising setting the value of the first parameter of each of the sound data on the basis of at least an amplitude of a waveform of the sound data.

14. The information processing method according to claim 13, further comprising setting, as the first parameter of each of the sound data, a value obtained by correcting the value set on the basis of the amplitude of the waveform with a further specified predetermined value.

15. The information processing method according to claim 12, further comprising, for each of the sound data:

setting an upper limit and a lower limit for the second parameter in a relationship between the distance and the second parameter corresponding to the first parameter set in the sound data in the second parameter attenuation characteristic data; and setting the sound volume attenuation characteristic such that the sound volume is not attenuated at the distance equal to or smaller than a first distance at which the second parameter is the upper limit, the sound is silent at the distance equal to or larger than a second distance at which the second parameter is the lower limit, and in association the distance being between the first distance and the second distance, the sound volume is attenuated at a degree of attenuation based on a relationship between the second parameter and the distance.

16. The information processing method according to claim 15, further comprising setting, as the lower limit, a value of the second parameter deemed as silent and set on the basis of a pre-specified condition.

17. The information processing method according to claim 15, further comprising setting, as the upper limit, a value obtained by adding, to the lower limit, a value obtained by subtracting a value corresponding to a pre-specified sound volume deemed as silent from a value based on an amplitude of the sound data.

18. The information processing method according to claim 12, wherein the second parameter in the second parameter attenuation characteristic data indicates a relationship in which second attenuation corresponding to the distance is performed in addition to first attenuation corresponding to a square of the distance.

19. The information processing method according to claim 15, wherein the second parameter in the second parameter attenuation characteristic data indicates a relationship in which second attenuation corresponding to the distance is performed in addition to first attenuation corresponding to a square of the distance, and the information processing method further comprises setting a filter characteristic in which a predetermined filter is applied to a waveform of the sound data at a strength corresponding to the distance at the distance equal to or larger than a third distance at which the second parameter is the upper limit, on the basis of second parameter attenuation characteristic data, for a high frequency range, indicating a relationship in which the second attenuation is added more strongly than attenuation indicated by the second parameter attenuation characteristic data.

20. The information processing method according to claim 19, wherein the filter includes a low-pass filter.

21. The information processing method according to claim 12, further comprising setting a filter characteristic in which a predetermined filter is applied to a waveform of the sound data at a strength corresponding to the distance, on the basis of the first parameter.

22. An information processing system, comprising:

a processor; and a memory configured to store compute readable instructions that, when executed by the processor, cause the information processing system to:

set a first parameter associated with a virtual sound pressure level and virtually indicating loudness of a sound, for each of a plurality of sound data, wherein the first parameter corresponds to a value indicated at a distance at which a second parameter serves as a reference, the second parameter indicates loudness of a virtual sound in a virtual space and is attenuated in accordance with a distance from a position of a sound source to a virtual microphone in the virtual space; and for each of the sound data, on the basis of at least second parameter attenuation characteristic data indicating a relationship, between a value of the second parameter and the distance, varied in accordance with a value of the first parameter, and the first parameter set in the sound data, set a sound volume attenuation characteristic used when a sound volume at which the sound data is outputted is attenuated in accordance with the distance from the sound source associated with the sound data, wherein the sound volume attenuation characteristic indicates a relationship between the distance and a degree of attenuation of the sound volume.

23. The information processing system according to claim 22, wherein the system is further caused to set the value of the first parameter of each of the sound data on the basis of at least an amplitude of a waveform of the sound data.

24. The information processing system according to claim 23, wherein the system is further caused to set, as the first parameter of each of the sound data, a value obtained by correcting the value set on the basis of the amplitude of the waveform with a further specified predetermined value.

25. The information processing system according to claim 22, wherein the system is further caused to, for each of the sound data:

set an upper limit and a lower limit for the second parameter in a relationship between the distance and the second parameter corresponding to the first parameter set in the sound data in the second parameter attenuation characteristic data; and set the sound volume attenuation characteristic such that the sound volume is not attenuated at the distance equal to or smaller than a first distance at which the second parameter is the upper limit, the sound is silent at the distance equal to or larger than a second distance at which the second parameter is the lower limit, and when the distance is between the first distance and the second distance, the sound volume is attenuated at a degree of attenuation based on a relationship between the second parameter and the distance.

26. The information processing system according to claim 25, wherein the system is further caused to set, as the lower limit, a value of the second parameter deemed as silent and set on the basis of a pre-specified condition.

27. The information processing system according to claim 25, wherein the system is further caused to set, as the upper limit, a value obtained by adding, to the lower limit, a value obtained by subtracting a value corresponding to a pre-specified sound volume deemed as silent from a value based on an amplitude of the sound data.

28. The information processing system according to claim 22, wherein the second parameter in the second parameter attenuation characteristic data indicates a relationship in which second attenuation corresponding to the distance is performed in addition to first attenuation corresponding to a square of the distance.

29. The information processing system according to claim 25, wherein the second parameter in the second parameter attenuation characteristic data indicates a relationship in which second attenuation corresponding to the distance is performed in addition to first attenuation corresponding to a square of the distance, and the system is further caused to set a filter characteristic in which a predetermined filter is applied to a waveform of the sound data at a strength corresponding to the distance at the distance equal to or larger than a third distance at which the second parameter is the upper limit, on the basis of second parameter attenuation characteristic data, for a high frequency range, indicating a relationship in which the second attenuation is added more strongly than attenuation indicated by the second parameter attenuation characteristic data.

30. The information processing system according to claim 29, wherein the filter includes a low-pass filter.

31. The information processing system according to claim 22, wherein the system is further caused to set a filter characteristic in which a predetermined filter is applied to a waveform of the sound data at a strength corresponding to the distance, on the basis of the first parameter.

32. An information processing apparatus, comprising:

processing circuitry including a processor, wherein the processing circuitry is configured to:

set a first parameter associated with a virtual sound pressure level and virtually indicating loudness of a sound, for each of a plurality of sound data, wherein the first parameter corresponds to a value indicated at a distance at which a second parameter serves as a reference, the second parameter indicates loudness of a virtual sound in a virtual space and is attenuated in accordance with a distance from a position of a sound source to a virtual microphone in the virtual space; and for each of the sound data, on the basis of at least second parameter attenuation characteristic data indicating a relationship, between a value of the second parameter and the distance, varied in accordance with a value of the first parameter, and the first parameter set in the sound data, set a sound volume attenuation characteristic used when a sound volume at which the sound data is outputted is attenuated in accordance with the distance from the sound source associated with the sound data, wherein the sound volume attenuation characteristic indicates a relationship between the distance and a degree of attenuation of the sound volume.

* * * * *